United States Patent
Tanimoto et al.

(10) Patent No.: US 9,130,783 B2
(45) Date of Patent: Sep. 8, 2015

(54) RELAY COMMUNICATION SYSTEM AND ACCESS MANAGEMENT APPARATUS

(75) Inventors: Yoshifumi Tanimoto, Kyoto (JP); Kazuo Soumiya, Kyoto (JP); Keisuke Nishimura, Kyoto (JP); Suguru Suzuki, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 142 days.

(21) Appl. No.: 13/390,561

(22) PCT Filed: Aug. 11, 2010

(86) PCT No.: PCT/JP2010/005041
§ 371 (c)(1),
(2), (4) Date: Feb. 15, 2012

(87) PCT Pub. No.: WO2011/021371
PCT Pub. Date: Feb. 24, 2011

(65) Prior Publication Data
US 2012/0151059 A1      Jun. 14, 2012

(30) Foreign Application Priority Data

Aug. 20, 2009   (JP) .................................. 2009-191014
Aug. 20, 2009   (JP) .................................. 2009-191029
Aug. 31, 2009   (JP) .................................. 2009-200697

(51) Int. Cl.
    *G06F 15/173*   (2006.01)
    *H04L 12/64*    (2006.01)
    (Continued)

(52) U.S. Cl.
    CPC ........ *H04L 12/6418* (2013.01); *H04L 12/2898* (2013.01); *H04L 12/4625* (2013.01); *H04L 12/5691* (2013.01); *H04L 63/102* (2013.01); *H04L 63/108* (2013.01)

(58) Field of Classification Search
    CPC .............. H04L 29/06; H04L 29/08072; H04L 29/08576
    USPC .......................................... 709/225, 227, 228
    See application file for complete search history.

(56) References Cited

U.S. PATENT DOCUMENTS 6,574,656 B1   6/2003   Nagaoka et al.
2003/0140637 A1   7/2003   Masui et al.
(Continued)

FOREIGN PATENT DOCUMENTS

JP      09-168055 A    6/1997
JP      2000-059465 A   2/2000
(Continued)

OTHER PUBLICATIONS

Tanimoto, "Relay-Server Arranged to Carry Out Communications Between Communication Terminals on Different LANs," U.S. Appl. No. 11/853,943, filed Sep. 12, 2007.
(Continued)

*Primary Examiner* — Hua Fan
*Assistant Examiner* — Van Kim T Nguyen
(74) *Attorney, Agent, or Firm* — Keating & Bennett, LLP

(57) ABSTRACT

A first relay server transmits, to an access management apparatus that manages an access right to a second relay server, an access request with respect to the second relay server. The access management apparatus confirms that the access right to the second relay server is set in the first relay server, and then requests the second relay server to permit an access by the first relay server. In a case where the second relay server permits the access from the first relay server, the access management apparatus notifies the first relay server of such access permission. Based on the notice from the access management apparatus, the first relay server establishes a routing session with the second relay server. By using the routing session, the first relay server starts the communication with a general server that serves as a maintenance target.

18 Claims, 18 Drawing Sheets

(51) Int. Cl.
*H04L 12/28* (2006.01)
*H04L 12/46* (2006.01)
*H04L 12/54* (2013.01)
*H04L 29/06* (2006.01)

(56) References Cited

U.S. PATENT DOCUMENTS

| | | | |
|---|---|---|---|
| 2003/0144872 | A1 | 7/2003 | Masui et al. |
| 2004/0218611 | A1 | 11/2004 | Kim |
| 2004/0260699 | A1* | 12/2004 | Aoki et al. .................. 707/9 |
| 2005/0281251 | A1* | 12/2005 | Yumoto et al. ............. 370/352 |
| 2007/0234416 | A1* | 10/2007 | Matsuoka et al. ........... 726/12 |
| 2008/0137672 | A1* | 6/2008 | Tanimoto .................... 370/401 |
| 2008/0147825 | A1 | 6/2008 | Tanimoto |
| 2008/0298367 | A1 | 12/2008 | Furukawa |
| 2009/0067451 | A1* | 3/2009 | Cotton et al. ............... 370/492 |
| 2009/0172075 | A1 | 7/2009 | Tanimoto |
| 2010/0211995 | A1 | 8/2010 | Yoshida |

FOREIGN PATENT DOCUMENTS

| | | | |
|---|---|---|---|
| JP | 2002-247036 | A | 8/2002 |
| JP | 2003-223521 | A | 8/2003 |
| JP | 2004-213533 | A | 7/2004 |
| JP | 2004-229299 | A | 8/2004 |
| JP | 2005-157699 | A | 6/2005 |
| JP | 2006-202218 | A | 8/2006 |
| JP | 2007-310508 | A | 11/2007 |
| JP | 2008-028600 | A | 2/2008 |
| JP | 2008-092520 | A | 4/2008 |
| JP | 2008-098699 | A | 4/2008 |
| JP | 2008-148046 | A | 6/2008 |
| JP | 2009-027652 | A | 2/2009 |
| JP | 2009-163316 | A | 7/2009 |
| JP | 2010-178089 | A | 8/2010 |
| JP | 2010-192947 | A | 9/2010 |
| JP | 2010-256989 | A | 11/2010 |
| JP | 2010-267084 | A | 11/2010 |
| JP | 2010-278636 | A | 12/2010 |
| JP | 2011-055452 | A | 3/2011 |
| JP | 2011-055453 | A | 3/2011 |
| JP | 2011-055454 | A | 3/2011 |
| JP | 2011-160103 | A | 8/2011 |

OTHER PUBLICATIONS

Tanimoto, "File Server Device Arranged in a Local Area Network and Being Communicable With an External Service Arranged in a Wide Area Network," U.S. Appl. No. 11/862,654, filed Sep. 27, 2007.
Tanimoto, "File Transfer Server," U.S. Appl. No. 11/870,622, filed Oct. 11, 2007.
Tanimoto, "Relay Server and Client Terminal," U.S. Appl. No. 11/953,351, filed Dec. 10, 2007.
Tanimoto, "Relay Server, Relay Communication System, and Communication Device," U.S. Appl. No. 11/944,495, filed Nov. 23, 2007.
Tanimoto, "Relay Server and Relay Communication System Arranged to Share Resources Between Networks," U.S. Appl. No. 11/953,505, filed Dec. 10, 2007.
Tanimoto, "Relay Server and Relay Communication System," U.S. Appl. No. 12/103,933, filed Apr. 16, 2008.
Tanimoto, "Relay Server and Relay Communication System," U.S. Appl. No. 12/112,127, filed Apr. 30, 2008.
Tanimoto, "Relay Server and Relay Communication System," U.S. Appl. No. 12/107,793, filed Apr. 23, 2008.
Tanimoto, "Relay Server and Relay Communication System," U.S. Appl. No. 12/270,883, filed Nov. 14, 2008.
Tanimoto, "Relay Server Adn Relay Communication System," U.S. Appl. No. 12/335,642, filed Dec. 16, 2008.
Tanimoto, "Relay Server and Relay Communication System," U.S. Appl. No. 12/335,661, filed Dec. 16, 2008.
Tanimoto, "Relay Server and Relay Communication System," U.S. Appl. No. 12/340,868, filed Dec. 22, 2008.
Tanimoto, "Relay Server and Relay Communication System," U.S. Appl. No. 13/061,234, filed Feb. 28, 2011.
Tanimoto, "Relay Server, Relay Communication System, and Communication Apparatus," U.S. Appl. No. 13/061,725, filed Mar. 2, 2011.
Tanimoto, "Relay Server, Communication System and Facsimile System," U.S. Appl. No. 10/045,698, filed Jan. 10, 2002.
Tanimoto, "Relay Server, Communication System and Facsimile System," U.S. Appl. No. 10/045,897, filed Jan. 10, 2002.
Tanimoto, "Relay Server for Relaying Communications Between Network Devices," U.S. Appl. No. 10/114,720, filed Apr. 1, 2002.
Tanimoto, "Relay Server," U.S. Appl. No. 10/114,963, filed Apr. 2, 2002.
Tanimoto, "Relay Server, Network Device, Communication System, and Communication Method," U.S. Appl. No. 10/116,615, filed Apr. 2, 2002.
Tanimoto, "Relay Device and Communication System," U.S. Appl. No. 11/723,466, filed Mar. 20, 2007.
Tanimoto, "Relay Device and Communication System," U.S. Appl. No. 13/341,711, filed Dec. 30, 2011.
Tanimoto, "First Relay Server and Second Relay Server," U.S. Appl. No. 13/255,958, filed Oct. 3, 2011.
Tanimoto, "Relay Communication System and First Relay Server," U.S. Appl. No. 13/320,034, filed Nov. 11, 2011.
Tanimoto, "Relay Server and Relay Communication System," U.S. Appl. No. 13/496,664, filed Mar. 16, 2012.
English translation of Official Communication issued in corresponding International Application PCT/JP2010/005041, mailed on Feb. 23, 2012.
Official Communication issued in International Patent Application No. PCT/JP2010/005041, mailed on Nov. 22, 2010.
Inai et al., "A Scalable Log Collecting Scheme for Host-Based Traffic Monitoring System," Information Processing Society of Japan Symposium Series, vol. 2008, No. 1, Jul. 2, 2008, 27 pages.
Tanimoto, "Relay Server and Relay Communication System Arranged to Share Resources Between Networks." U.S. Appl. No. 13/153,497, filed Jun. 6, 2011.

* cited by examiner

Fig. 2

```
<?xml version="1.0" encoding="UTF-8" standalone="no" ?>
-<root>
 -<group id="groupA"
    lastmod="20070402133100" name="GROUP A" >
    <site id="rs-1@abc.net" />
    <site id="rs-2@abc.net" />
 </group>
</root>
```

```
<?xml version= "1.0" encoding= "UTF-8" ?>
-<root>
  -<site id= "rs-1@abc.net"
     name= "RS-1" stat= "active" >
     <node div= "software"
       group= "groupA"
       id= "cl-11@rs-1.abc.net"    522-1
       name= "CL-11"
       site= "rs-1@abc.net" />
  </site>
  -<site id= "rs-2@abc.net"
     name= "RS-2" stat= "active" >
     <node div= "software"
       group= "groupA"
       id= "cl-21@rs-2.abc.net"    522-2
       name= "CL-21"
       site= "rs-2@abc.net" />
  </site>
</root>
```

```
<?xml version= "1.0" encoding= "UTF-8" ?>
-<root>
  <node div= "software"
    group= "groupA"
    node addr= "172.16.0.11" expr= "1213935960484"
    id= "cl-11@rs-1.abc.net"
    name= "CL-11" pass= "cl-11" port= "5070" />
</root>
```
53

Fig. 4B

```
<?xml version= "1.0" encoding= "UTF-8" ?>
-<root>
  <node div= "software"
    group= "groupA"
    node addr= "192.168.2.21" expr= "1213935978484"
    id= "cl-21@rs-2.abc.net"
    name= "CL-21" pass= "cl-21" port= "5070" />
</root>
```
54

Fig. 8

| Access Target Apparatus | Access Right Holding Apparatus |
|---|---|
| rs-1@abc.net | rs-2@abc.net |
| | cl-21@rs-2.abc.net |
| | rs-3@abc.net |
| | cl-31@rs-3.abc.net |
| cl-11@rs-1.abc.net | rs-2@abc.net |
| | rs-3@abc.net |
| | cl-31@rs-3.abc.net |

Fig. 11

| Upper Information (site TAG) | | Lower Information (node TAG) | |
|---|---|---|---|
| id<br>Relay Server<br>Identification Info. | stat<br>Operation<br>State | id<br>Client Terminal<br>Identification Info. | site<br>Log on<br>Destination |
| rs-1@abc.net | active | cl-11@rs-1.abc.net | rs-1@abc.net |
| rs-2@abc.net | active | cl-21@rs-2.abc.net | rs-2@abc.net |
| rs-3@abc.net | active | cl-31@rs-3.abc.net | rs-3@abc.net |

| Access Request Source | Access Request Destination | Update Time | Connection State |
|---|---|---|---|
| rs-2@abc.net | rs-1@abc.net | 13:45:23 | Standby for Access |
| | | 13:45:27 | Session is Established |
| | | 14:18:52 | Session is Disconnected |

Fig. 16

| Access Request Source | Access Request Destination | Update Time | Connection State |
|---|---|---|---|
| rs-2@abc.net | rs-1@abc.net | 13:45:23 | Standby for Access |
| | | 13:45:27 | Session is Established |
| | | 14:45:27 | Session Disconnection is instructed |
| | | 14:45:29 | Session is Disconnected |

Fig. 18

| Access Request Source | Access Request Destination | Update Time | Connection State |
|---|---|---|---|
| rs-2@abc.net | rs-1@abc.net | 13:45:18 | ConfirmationRequest is Transmitted |
| | | 13:45:23 | Access is Instructed |
| | | 13:45:27 | Session is Established |
| | | 14:18:52 | Session is Disconnected |

RELAY COMMUNICATION SYSTEM AND ACCESS MANAGEMENT APPARATUS

BACKGROUND OF THE INVENTION

1. Field of the Invention

The present invention relates to a relay communication system that enables computers connected to two different local area networks (LANs) to make communication with each other beyond a wide area network (WAN).

2. Description of the Related Art

Conventionally, a remote maintenance system, which performs, from a remote location, monitoring and maintenance for an electronic instrument installed at home, office or the like, has been put into practical use. By using the remote maintenance system, a service technician at a maintenance company can perform maintenance work for the electronic instrument without visiting the actual location where the electronic instrument is installed. There is a merit that the maintenance company can reduce costs by using the remote maintenance system. Even in the case where a problem with the electronic instrument occurs, the service technician can operate the electronic instrument remotely, thus quickly solving the problem that has occurred. In this way, there is a merit also for a user of the electronic instrument that uses the remote maintenance system.

Japanese Patent Laid-Open Publication No. 2003-223521 discloses a technique for monitoring, from a remote location, an operation control device that controls an air conditioner. The maintenance company of the air conditioner purchases a recording medium, in which monitoring software, a password for accessing the operation control device, and the like are recorded, from the manufacturer of the air conditioner in order to acquire monitoring data of the air conditioner from the operation control device.

The maintenance company accesses the operation control device by using the password recorded in the recording medium, and acquires the monitoring data from the operation control device by using the monitoring software. In the case where abnormalities are found in the operation control device when analyzing the monitoring data, the maintenance company performs remote maintenance for the operation control device.

However, timing at which an access right to the operation control device can be set for the maintenance company is limited to the time when the maintenance company purchases the recording medium. Even in the case where the maintenance company is replaced, there is a concern that the previous maintenance company may illegally access the operation control device by using the password recorded in the recording medium.

Moreover, in the case where the maintenance company continuously accesses the operation control device for a long time, there is a concern that a third party other than the service technician may access the operation control device.

Furthermore, the maintenance company cannot confirm the abnormalities that have occurred in the operation control device, until the monitoring data is analyzed. Therefore, it has been difficult to quickly deal with the abnormalities that have occurred in the operation control device.

SUMMARY OF THE INVENTION

In consideration of the foregoing problems, preferred embodiments of the present invention provide a technique capable of easily controlling communication between the electronic instrument as a maintenance target and a computer that performs the remote maintenance.

A description is made below of a plurality of preferred embodiments of the present invention. One or more aspects of the various preferred embodiments can be combined with one another as desired or needed.

A relay communication system according to a preferred embodiment of the present invention includes a first relay apparatus; a second relay apparatus; and an access management apparatus. The access management apparatus holds a list of apparatuses accessible by the first relay apparatus. The first relay apparatus requests, to the access management apparatus, the list of the apparatuses accessible by the first relay apparatus, selects the second relay apparatus from the list, and transmits to the access management apparatus an access request to the second relay apparatus. The second relay apparatus is in an initial state of denying access from apparatuses other than the access management apparatus, and shifts to a standby state for connection to the first relay apparatus when having received an access permission request from the access management apparatus. The access management apparatus includes an access permission unit and a notification unit. The access permission unit, when having received from the first relay apparatus an access request to the second relay apparatus, determines whether or not to permit the first relay apparatus to access the second relay apparatus based on the list. In a case where the first relay apparatus is permitted to access the second relay apparatus, the notification unit notifies the second relay apparatus of the access permission request, and notifies the first relay apparatus of an access permission to the second relay apparatus. The first relay apparatus includes a communication session establishment unit that establishes a communication session with the second relay apparatus upon receipt of the access permission. Each of the first relay apparatus and the second relay apparatus includes a relay communication unit that relays, by using the communication session, communication between a first communication terminal connected to a first LAN on the first relay apparatus side and a second communication terminal connected to a second LAN on the second relay apparatus side.

The access management apparatus may further include a list transmission unit that transmits the list to the first relay apparatus, and the first relay apparatus may further include a selection unit that selects the second relay apparatus as an access request destination by using the list.

The first relay apparatus may further include an access status notification unit that notifies the access management apparatus of an access status with respect to the second relay apparatus, and the access management apparatus may further include an access recording unit that records a change of the access status based on the notice from the access status notification unit.

Each of the first relay apparatus, the second relay apparatus and the access management apparatus may further include a relay server information sharing unit that shares among each other a relay server information. The relay server information includes activation information of the first relay apparatus and the second relay apparatus, and includes activation/registration information of client terminals connected to the first relay apparatus and the second relay apparatus.

The first relay apparatus may further include a display unit that displays the relay server information.

The communication session may be a routing session that serves as a media session that performs routing control for a communication packet to be transferred between the first relay apparatus and the second relay apparatus.

In the routing session, the first relay apparatus and the second relay apparatus may exchange network addresses with each other after the routing session is established.

In exchanging the network addresses, the first relay apparatus and the second relay apparatus respectively may permit accesses to all terminals connected to the respective LANs to which the first relay apparatus and the second relay apparatus are connected.

In exchanging the network addresses, the first relay apparatus or the second relay apparatus respectively may permit accesses to a portion of the terminals connected to the respective LANs to which the first relay apparatus and the second relay apparatus are connected.

An access management apparatus according to another preferred embodiment of the present invention is an apparatus capable of performing communication with a first relay apparatus and a second relay apparatus, including a list transmission unit; an access permission unit; and a notification unit. The list transmission unit holds a list of apparatuses accessible by the first relay apparatus, and transmits the list to the first relay apparatus. When having received, from the first relay apparatus, an access request to the second relay apparatus, the access permission unit determines whether or not to permit the first relay apparatus to access the second relay apparatus based on the list. In a case where the first relay apparatus is permitted to access the second relay apparatus, the notification unit notifies the second relay apparatus that there is an access from the first relay apparatus, and notifies the first relay apparatus of an access permission to the second relay apparatus.

A relay communication system according to another preferred embodiment of the present invention includes a first relay apparatus; a second relay apparatus; and an access management apparatus. The access management apparatus includes an access permission unit; a notification unit; and a session information acquisition unit. The access permission unit holds a list of apparatuses accessible by the first relay apparatus and when having received from the first relay apparatus an access request to the second relay apparatus, determines whether or not to permit the first relay apparatus to access the second relay apparatus based on the list. In a case where the first relay apparatus is permitted to access the second relay apparatus, the notification unit notifies the second relay apparatus that there is an access from the first relay apparatus, and notifies the first relay apparatus of an access permission to the second relay apparatus. The session information acquisition unit acquires, from the first relay apparatus, a session information regarding a communication session established between the first relay apparatus and the second relay apparatus based on the access permission. The first relay apparatus includes a communication session establishment unit that establishes the communication session with the second relay apparatus when having received the access permission. Each of the first relay apparatus and the second relay apparatus includes a relay communication unit that relays, by using the communication session, communication between a first communication terminal connected to a first LAN on the first relay apparatus side and a second communication terminal connected to a second LAN on the second relay apparatus side. The access management apparatus further includes a disconnection instruction unit that, in a case where it has been determined that the communication session satisfies a predetermined condition based on the session information, transmits a disconnection instruction of the communication session to the first relay apparatus or the second relay apparatus.

The first relay apparatus may further include an establishment notification unit that transmits an establishment notice of the communication session to the access management apparatus, and the disconnection instruction unit may instruct the first relay apparatus to disconnect the communication session in a case where a time that has elapsed since the establishment notice was received reaches a predetermined time or more.

An access management apparatus according to still another preferred embodiment of the present invention is an apparatus capable of performing communication with a first relay apparatus and a second relay apparatus, including an access permission unit; a notification unit; a session information acquisition unit; and a disconnection instruction unit. The access permission unit holds a list of apparatuses accessible by the first relay apparatus and when having received from the first relay apparatus an access request to the second relay apparatus, and determines whether or not to permit the first relay apparatus to access the second relay apparatus based on the list. In a case where the first relay apparatus is permitted to access the second relay apparatus, the notification unit notifies the second relay apparatus that there is an access from the first relay apparatus, and notifies the first relay apparatus of an access permission to the second relay apparatus. The session information acquisition unit acquires, from the first relay apparatus, a session information regarding a communication session established between the first relay apparatus and the second relay apparatus based on the access permission. In a case where it has been determined that the communication session satisfies a predetermined condition based on the session information, the disconnection instruction unit transmits a disconnection instruction of the communication session to the first relay apparatus or the second relay apparatus.

A relay communication system according to still another preferred embodiment of the present invention includes a first relay apparatus; a second relay apparatus; and an access management apparatus. The first relay apparatus transmits a predetermined information to the access management apparatus. The first relay apparatus is in an initial state of denying access from apparatuses other than the access management apparatus, and shifts to a standby state for connection to the second relay apparatus when having received from the access management apparatus a notice that there is an access from the second relay apparatus. The access management apparatus includes a list holding unit; a specification unit; and an access instruction unit. The list holding unit holds a permission list as a list of apparatuses capable of accessing the first relay apparatus. The specification unit specifies the second relay apparatus based on the permission list when having received predetermined information from the first relay apparatus. The access instruction unit notifies the first relay apparatus that there is an access from the second relay apparatus, and instructs the second relay apparatus to access the first relay apparatus. The second relay apparatus includes a communication session establishment unit that establishes a communication session between the first relay apparatus and the second relay apparatus based on the instruction from the access instruction unit. Each of the first relay apparatus and the second relay apparatus includes a relay communication unit that relays, by using the communication session, communication between a communication terminal connected to a LAN on the first relay apparatus side and a communication terminal connected to a LAN on the second relay apparatus side.

The access management apparatus may further include a confirmation unit that confirms whether or not the second relay apparatus specified by the specification unit is in a state of being capable of accessing the first relay apparatus.

The second relay apparatus may further include a notification unit that notifies the access management apparatus of a change of a communication status between the first relay apparatus and the second relay apparatus, and the access management apparatus may further include a recording unit that records the change of the communication status based on the notice from the notification unit.

An access management apparatus according to still another preferred embodiment of the present invention is an apparatus capable of performing communication with a first relay apparatus and a second relay apparatus, including a list holding unit; a specification unit; a confirmation unit; and an access instruction unit. The list holding unit holds a permission list as a list of apparatuses capable of accessing the first relay apparatus. The specification unit specifies the second relay apparatus based on the permission list when having received a predetermined information from the first relay apparatus. The confirmation unit confirms whether or not the second relay apparatus specified by the specification unit is in a state of being capable of accessing the first relay apparatus. In a case where the second relay apparatus is in the state of being capable of accessing the first relay apparatus, the access instruction unit notifies the first relay apparatus that there is an access from the second relay apparatus, and instructs the second relay apparatus to access the first relay apparatus.

In the relay communication system according to a preferred embodiment of the present invention, the access management apparatus permits the first relay apparatus to access the second relay apparatus based on the list of the apparatuses accessible by the first relay apparatus. Based on the access permission of the access management apparatus, the first relay apparatus establishes the communication session between the first relay apparatus and the second relay apparatus. In such a way, the access management apparatus can control the communication between the first relay apparatus and the second relay apparatus, and accordingly, an illegal access to the second LAN on the second relay apparatus side can be prevented.

The access management apparatus transmits, to the first relay apparatus, the list of the apparatuses for which access rights are set for the first relay apparatus. Based on the received list, the first relay apparatus determines the access request destination. In such a way, a user of the first relay apparatus can easily confirm the apparatuses accessible by the first relay apparatus.

The first relay apparatus notifies the access management apparatus of the change of the access status to the second relay apparatus. Based on the notice coming from the first relay apparatus, the access management apparatus records the access status of the first relay apparatus with respect to the second relay apparatus. In such a way, the communication status between the first relay apparatus and the second relay apparatus can be readily and easily ascertained.

In the relay communication system according to another preferred embodiment of the present invention, the first relay apparatus acquires the access permission to the second relay apparatus from the access management apparatus, and establishes the communication session between the first relay apparatus and the second relay apparatus. At a time of determining that the communication session satisfies a predetermined condition, the access management apparatus instructs the first relay apparatus to disconnect the communication session. In such a way, the access management apparatus can control the establishment and disconnection of the communication session in a unified way.

At a time of determining that a predetermined time has elapsed since the establishment notice was received, the access management apparatus instructs the first relay apparatus or the second relay apparatus to disconnect the communication session. In such a way, the communication session can be surely disconnected within a fixed time, and accordingly, the risk of an illegal access to the second LAN using the communication session can be lowered.

In the relay communication system according to still another preferred embodiment of the present invention, in the case of having received predetermined information from the first relay apparatus, the access management apparatus specifies the second relay apparatus based on the permission list. Based on the instruction from the access management apparatus, the second relay apparatus establishes the communication session between the first relay apparatus and the second relay apparatus. Such predetermined information may be, for example, information that indicates an operation of the communication terminal connected to the LAN on the first relay apparatus side, and the like. Hence, in response to the status of the communication terminal connected to the LAN on the first relay apparatus side, the communication between the first relay apparatus and the second relay apparatus can be controlled.

The access management apparatus confirms whether or not the second relay apparatus specified based on the permission list is in a state of being capable of accessing the first relay apparatus. In such a way, the access management apparatus can instruct the apparatus that can surely access the first relay apparatus to access the first relay apparatus.

The second relay apparatus notifies the access management apparatus of the change of the communication status between the first relay apparatus and the second relay apparatus. The access management apparatus records therein the change of the communication status based on the notice from the second relay apparatus. In such a way, the communication status between the first relay apparatus and the second relay apparatus can be grasped with ease.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a view showing details of relay group information.
FIG. 3 is a view showing details of relay server information.
FIG. 4A is a view showing details of client terminal information.
FIG. 4B is a view showing details of client terminal information.
FIG. 8 is a table showing an access permission list.
FIG. 11 is a view showing the relay server information in a table format.
FIG. 12 is a table showing access record information.

FIG. 16 is a table showing access record information.

FIG. 18 is a table showing access record information.

DETAILED DESCRIPTION OF THE PREFERRED EMBODIMENTS

Figure 1:
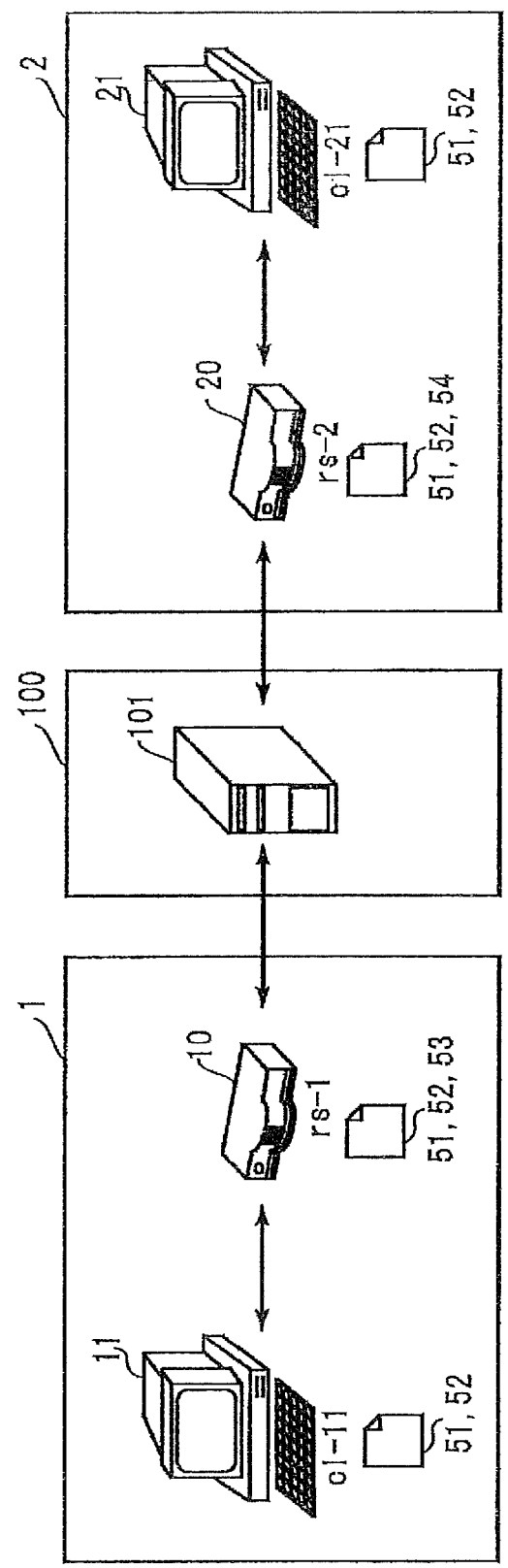
FIG. 1 is a view showing a basic configuration of a relay communication system.

A description will be made below of preferred embodiments of the present invention while referring to the drawings.

1. First Preferred Embodiment

A description will be made of an outline of a relay communication system according to the present preferred embodiment. FIG. 1 is a view showing a basic configuration of the relay communication system. The relay communication system shown in FIG. 1 preferably includes LANs 1 and 2 and a WAN 100. The WAN 100 is a wide area network, for example, such as the Internet.

A relay server 10 and a client terminal 11 are connected to the LAN 1. A relay server 20 and a client terminal 21 are connected to the LAN 2. A session initiation protocol (SIP) server 101 is connected to the WAN 100.

The client terminals 11 and 21 are terminals such as personal computers. The relay servers 10 and 20 relay communication between the client terminal 11 and the client terminal 21. The SIP server 101 relays communication between the relay server 10 and the relay server 20. In this preferred embodiment, the SIP is preferably used as the communication protocol between the relay server 10 and the relay server 20, for example. However, protocols other than the SIP may be used.

The relay servers 10 and 20 and the client terminals 11 and 21 constitute a relay group capable of communication therebetween, and hold information required for participation in the relay group. The relay server 10 holds relay group information 51, relay server information 52 and client terminal information 53. The relay server 20 holds the relay group information 51, the relay server information 52 and client terminal information 54. The client terminals 11 and 21 hold the relay group information 51 and the relay server information 52.

FIG. 2 is a view showing the relay group information 51. The relay group information 51 includes upper information 511. The upper information 511 corresponds to a group tag.

The upper information 511 is information regarding the relay group. "id" is an identification information of the relay group, in which "groupA" is set. "lastmod" indicates a latest update time of the relay group information 51. "name" is a name of the relay group.

Lower information 512 is information regarding the relay servers located at a lower level below the relay group. The lower information 512 is incorporated as site tags in the upper information 511. "id" indicates an identification information of the relay servers. In the respective site tags, there are set: "rs-1@abc.net" as the identification information of the relay server 10, and "rs-2@abc.net" as the identification information of the relay server 20. In the case where a new relay server is added to the relay group, a site tag corresponding to the new relay server is added to the lower information 512.

FIG. 3 is a view showing the relay server information 52. The relay server information 52 is information regarding the relay servers and the client terminals, which constitute the relay group. The relay server information 52 includes upper information 521-1 and 521-2. The upper information 521-1 and 521-2 correspond to the site tags.

The upper information 521-1 and 521-2 are information regarding the relay servers, which are located at an upper level, and correspond to the relay servers 10 and 20, respectively. "id", "name" and "stat" indicate the identification information, name and start state of the respective relay servers. If the relay server is started, then the start state of the relay server is set as: "stat='active'".

The upper information 521-1 includes lower information 522-1. The lower information 522-1 is information regarding the client terminal 11 located at a lower level below the relay server 10. The lower information 522-1 corresponds to a node tag, and is incorporated in the site tag (upper information 521-1). In a similar way, the upper information 521-2 includes lower information 522-2 as information regarding the client terminal 21 located at a lower level below the relay server 20.

In each of the lower information 522-1 and 522-2, "div", "id" and "name" indicate a name of an installed division, identification information and name of the respective client terminals. "group" indicates the identification information of a relay group to which the client terminal belongs. "site" indicates the identification information of the relay server as a log-on destination of the client terminal.

If "site='rs-1@abc.net'" is set in the lower information 522-1, then the client terminal 11 has logged on to the relay server 10. In this case, the relay server 20 and the client terminal 21 can communicate with the client terminal 11 through the relay server 10. Meanwhile, if the client terminal 11 is not logged on to the relay server 10, then the field of "site" is blank. Thus the relay server 20 and the client terminal 21 cannot communicate with the client terminal 11.

The number of such node tags (lower information) included in the site tag (upper information) is changed depending on the number of client terminals connected to the relay server. For example, in the case where a new client terminal is connected to the relay server 10, a node tag (lower information) corresponding to the new client terminal is added to the site tag.

FIG. 4A is a view showing the client terminal information 53. In the client terminal information 53, information regarding the client terminal 11 is set. "div", "node addr", "name" and "pass" indicate an installed division name, an internet protocol (IP) address, name and password of the client terminal 11. "id" indicates the identification information of the client terminal 11. The identification information of the client terminal 11 is "cl-11@rs-1.abc.net". "expr" indicates a log-on expiration period of the client terminal 11. "port" indicates a port number to be used by the client terminal 11 when the client terminal 11 performs communication in the relay group. If the client terminal 11 is not logged on to the relay server 10, then "expr" and "port" are blank.

FIG. 4B is a view showing the client terminal information 54 corresponding to the client terminal 21. The information regarding the client terminal 21 is recorded in the client terminal information 54 in a similar way to the client terminal information 53. The identification information of the client terminal 21 is "cl-21@rs-2.abc.net".

The relay group information 51 is updated when the number of relay servers which constitute the relay group is changed. The relay server information 52 is updated when a configuration of the relay group, an operation state of a relay server, and a log-on state of a client terminal are changed, and so on.

For example, in the case where the client terminal 11 has logged off from the relay server 10, the relay server 10 updates the relay server information 52 held by the relay server 10, and transmits an update notice of the relay server information 52 to the relay server 20. The relay server 20 relays the update notice to the client terminal 21. Based on the update notice, the relay server 20 and the client terminal 21 update the relay server information 52. In this way, by referring to the relay group information 51 and the relay server information 52, each user of the relay servers 10 and 20 and the client terminals 11 and 21 can confirm, in real time, the configuration of the relay group, the operation state of each computer, and the like.

The client terminal information 53 and 54 are used when the relay servers 10 and 20 relay data destined to the client terminals 11 and 21. A case is considered, where the relay server 10 has received data, in which the identification information of the client terminal 11 is designated as a transmission destination, from the relay server 20. The relay server 10 specifies the IP address of the client terminal 11 based on the identification information of the client terminal 11, which is designated as the transmission destination, and based on the client terminal information 53. The relay server 10 relays the received data to the client terminal 11 by using the specified IP address.

Figure 5:
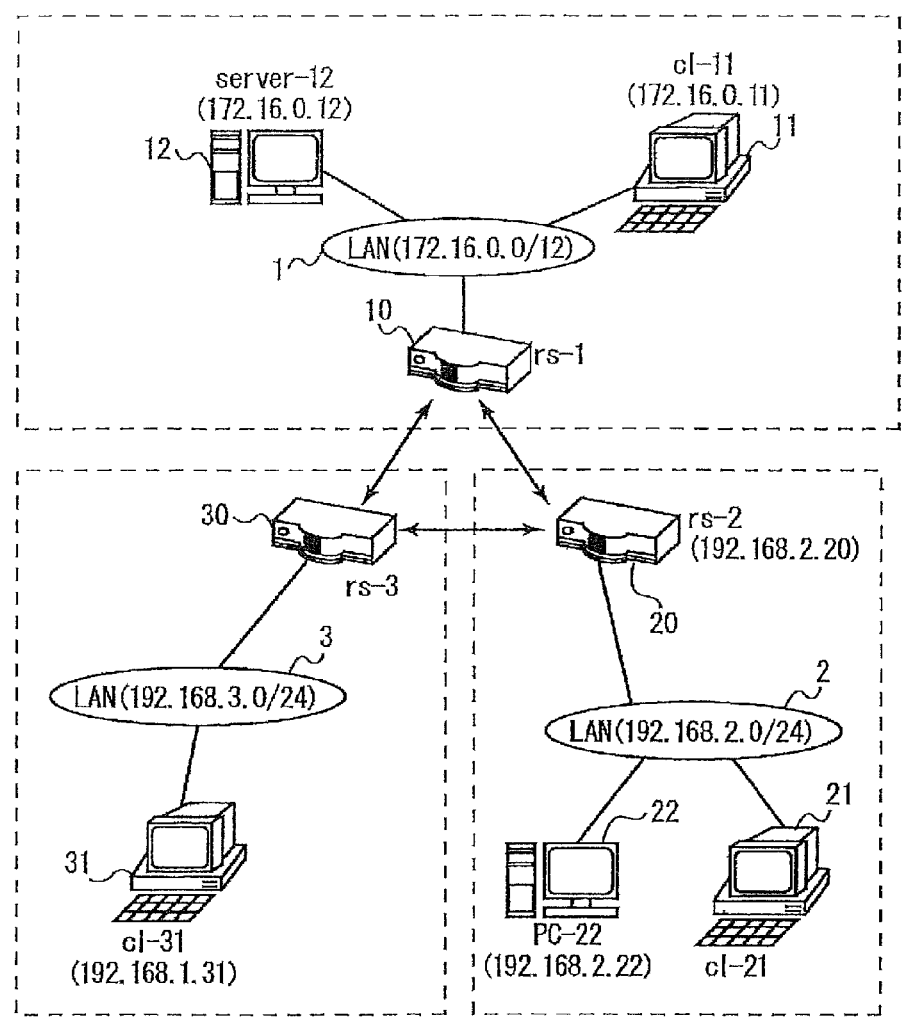
FIG. 5 is a view showing a configuration of the relay communication system at a time of being used for remote maintenance.

A description will now be provided in detail of a remote maintenance system using the above-mentioned relay communication system. FIG. 5 is a view showing a configuration of the remote maintenance system. The remote maintenance system shown in FIG. 5 has a configuration in which a LAN 3 is newly added to the LANs 1 and 2 shown in FIG. 1. In FIG. 5, indication of the WAN 100 and the SIP server 101 is omitted.

The LAN 1 is a user network to be used by the user. Network address of the LAN 1 is "172.16.0.0/12" (12 at the end is a subnet mask). To the LAN 1, there are connected the relay server 10, the client terminal 11, and a general server 12. The general server 12 may be a file server, a Web server, or the like, which serves as a target of the remote maintenance. The general server 12 does not function as the relay server or the client terminal.

The LANs 2 and 3 are networks to be used by a maintenance company that performs the remote maintenance for the LAN 1.

The LAN 2 may be located at a maintenance center, in which a service technician of the maintenance company is always stationed. Network address of the LAN 2 is "192.168.2.0/24". To the LAN 2, there are connected: the relay server 20, the client terminal 21, and a general terminal 22. The general terminal 22 is a computer that does not function as the relay server or the client terminal, in a similar way to the general server 12. The service technician performs the remote maintenance for the general server 12, which is connected to the LAN 1, by using the relay server 20.

The LAN 3 is preferably provided at a call center that receives inquiries and the like from users. Network address of the LAN 3 is "192.168.3.0/24". To the LAN 3, there are connected: an access management apparatus 30, and a client terminal 31. The access management apparatus 30 functions as a relay server, and in addition, manages an access right to the relay server 10 and the client terminal 11. Therefore, the access management apparatus 30 is capable of communication, which is made through the WAN 100, with the relay servers 10 and 20 and the client terminals 11 and 21.

In the case where the service technician performs the remote maintenance for the general server 12 by using the relay server 20, a routing session is established between the relay server 10 and the relay server 20.

The routing session is a media session to perform routing control for a communication packet to be transferred between the LAN 1 and the LAN 2. The general server 12 does not function as the relay server or the client terminal, and accordingly, is not registered in the relay server information. Hence, normally, the relay server 20 cannot communicate with the general server 12 that is connected to the LAN 1. However, the use of the routing session enables the relay server 20 to communicate with the general server 12.

In order to establish the routing session, the relay server 20 acquires an access permission from the relay server 10 through the access management apparatus 30. After acquiring the access permission to the relay server 10, the relay server 20 establishes the routing session between the relay server 10 and the relay server 20. In this way, the access management apparatus 30 manages access to the relay server 10 and the client terminal 11, which are connected to the LAN 1, thereby restricting unnecessary access to the LAN 1.

Figure 6:
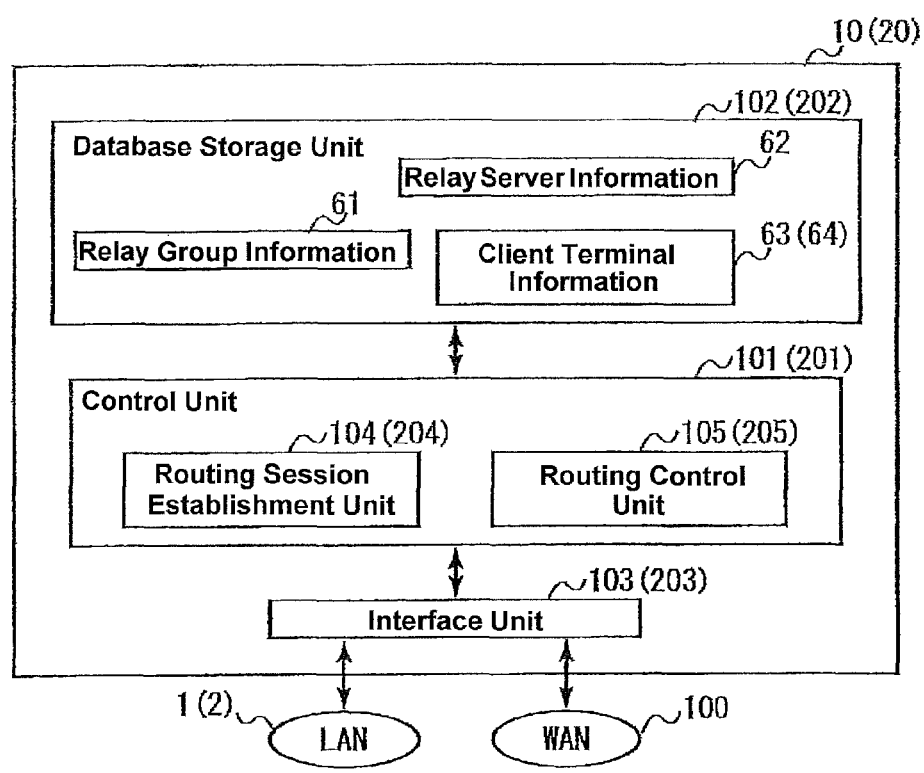
FIG. 6 is a view showing a configuration of a relay server.

FIG. 6 is a view showing a configuration of each of the relay servers 10 and 20. In FIG. 6, numbers in parentheses are reference numerals related to the relay server 20.

The relay server 10 (20) includes a control unit 101 (201), a database storage unit 102 (202), and an interface unit 103 (203).

The control unit 101 (201) performs overall control for the relay server 10 (20). The control unit 101 (201) includes a routing session establishment unit 104 (204) and a routing control unit 105 (205). The routing session establishment unit 104 (204) establishes the routing session between the relay server 10 and the relay server 20. The routing control unit 105 (205) performs the routing control for the communication packets between the LAN 1 and the LAN 2 using the routing session.

The database storage unit 102 (202) stores therein: relay group information 61, relay server information 62, and client terminal information 63 (64). In a similar way to FIG. 3, in the relay group information 61, the identification information of the relay servers 10 and 20 and the access management apparatus 30 is recorded. In the client terminal information 63 (64), the information regarding the client terminal 11 (21) is recorded. The relay server information 62 will be described later.

The interface unit 103 (203) performs communication within the LAN 1 (2) by using a private IP address. The interface unit 103 (203) performs communication, which is made through the WAN 100, by using a global IP address.

Figure 7:
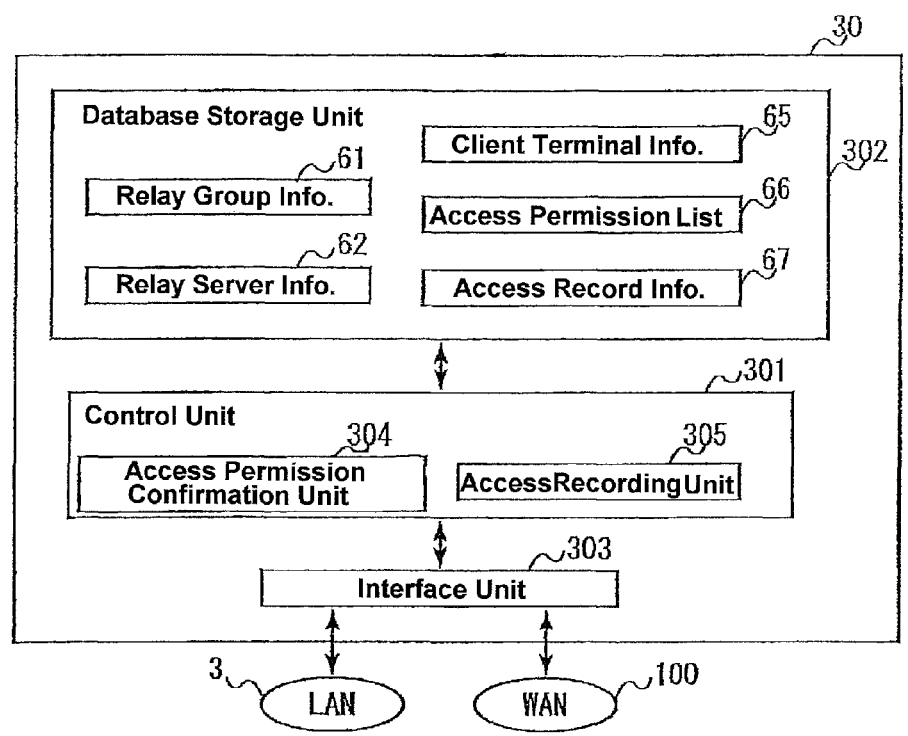
FIG. 7 is a view showing a configuration of an access management apparatus.

FIG. 7 is a view showing a configuration of the access management apparatus 30. The access management apparatus 30 includes a control unit 301, a database storage unit 302, and an interface unit 303.

The control unit 301 performs overall control for the access management apparatus 30. The control unit 301 includes an access permission confirmation unit 304 and an access recording unit 305. The access permission confirmation unit 304, in response to an access request from the relay server 20, confirms whether or not the relay server 10 permits access from the relay server 20. The access recording unit 305 records a status of the access from the relay server 20 to the relay server 10.

The database storage unit 302 stores therein: the relay group information 61, the relay server information 62, client terminal information 65, an access permission list 66, and access record information 67. In the client terminal information 65, information regarding the client terminal 31 is recorded. The access permission list 66 is a list of apparatuses whose accesses are permitted by the relay server 10 and the client terminal 11, which are connected to the LAN 1. The access record information 67 is information that records a change of a communication state of the relay server 20 that is accessing the relay server 10.

The interface unit 303 performs communication made within the LAN 3 and communication made through the WAN 100 in a similar way to the interface unit 103 of the relay server 10.

A description will now be provided of operations of the remote maintenance system when the service technician at the maintenance center operates the relay server 20 to perform the remote maintenance for the general server 12.

At the call center, an administrator of the access management apparatus 30 creates the access permission list 66. The access permission list 66 is stored in the database storage unit 302.

FIG. 8 is a view showing the access permission list 66. The access permission list 66 is information in which identification information of access target apparatuses and identification information of apparatuses permitted to access the access target apparatuses are associated with each other. The relay servers and the client terminals are set in the access permission list 66, and not the general server 12 and the general terminal 22. In FIG. 8, "rs-3@abc.net" is identification information of the access management apparatus 30. "cl-31@rs-3.abc.net" is identification information of the client terminal 31.

For example, apparatuses in which the access right to the relay server 10 is set are the relay server 20, the client terminals 21 and 31, and the access management apparatus 30. In this way, the access management apparatus 30 manages the apparatuses, which can access the relay server 10 and the client terminal 11, in a unified manner by using the access permission list 66. Simply by changing the access permission list 66, the apparatuses which can access the relay server 10 and the client terminal 11 can be changed with ease.

Figure 9:
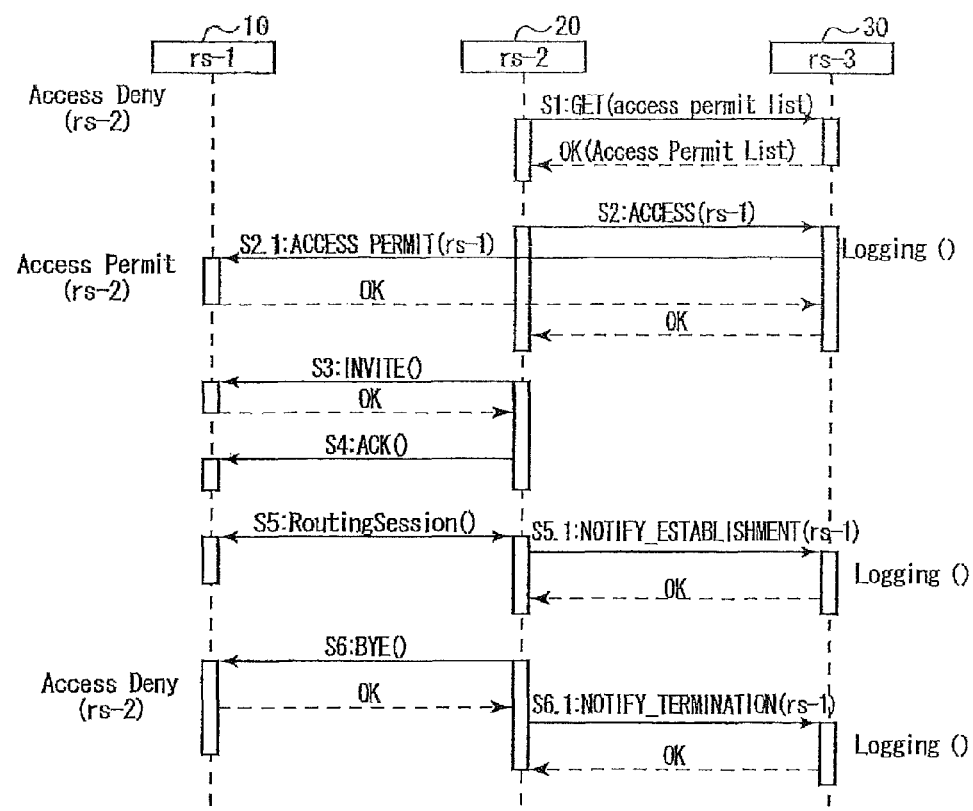
FIG. 9 is a chart showing a flow of the remote maintenance.

FIG. 9 is a chart showing a flow of the remote maintenance for the general server 12. As an initial state, the relay server 10 is in a state of accepting access from the access management apparatus 30 and denying accesses from the relay server 20 and the client terminals 21 and 31.

Based on the operation by the service technician, the relay server 20 requests the access management apparatus 30 to transmit a selection list 68 (Step S1). The selection list 68 is a list of relay servers and client terminals which permit the access from the relay server 20. The access management apparatus 30 extracts, from the access permission list 66, information corresponding to the relay server 20, and creates the selection list 68. The selection list 68 is transmitted from the access management apparatus 30 to the relay server 20.

Figure 10:
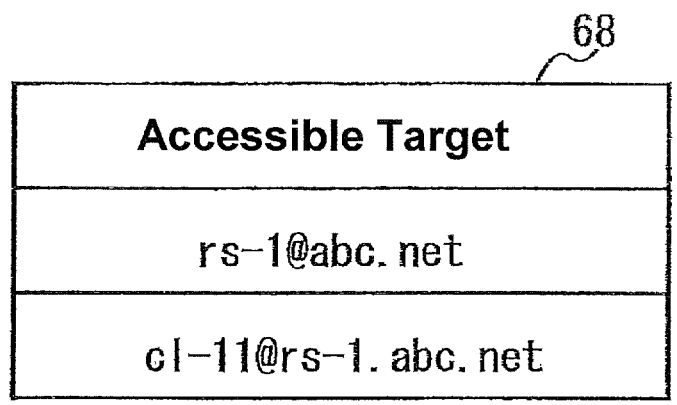
FIG. 10 is a table showing a selection list.

FIG. 10 is a table showing the selection list 68. In the selection list 68, the relay server 10 and the client terminal 11 are set as the apparatuses which permit the access from the relay server 20. The service technician displays the selection list 68 on a monitor of the relay server 20, and confirms that the access right to the relay server 10 is set in the relay server 20.

Next, with reference to the relay server information 62, the service technician confirms that the relay server 10 is in operation. FIG. 11 is a view showing the relay server information 62 in a table format. Actually, the relay server information 62 is described in an eXtensible Markup Language (XML) format like the relay server information 52 (refer to FIG. 3).

In FIG. 11, left-side columns of the relay server information 62 are upper information 621, and correspond to the site tags (refer to FIG. 3). In the upper information 621, only the identification information and operation state of the relay servers are shown. Right-side columns of the relay server information 62 are lower information 622, and correspond to the node tags (refer to FIG. 3). In the lower information 622, only the identification information and log-on destination of the client terminals are shown.

With reference to the relay server information 62 displayed on the monitor, the service technician confirms that the relay server 10 is in operation. The service technician operates the relay server 20, and instructs the relay server 20 to establish a routing session between the relay server 10 and the relay server 20.

FIG. 9 is referred to again. Based on such an instruction to establish the routing session, the relay server 20 transmits, to the access management apparatus 30, an access request with respect to the relay server 10 (Step S2). As mentioned above, the relay server 10 is in a state of not permitting the access from the relay server 20. Therefore, before requesting the relay server 10 to establish the routing session, the relay server 20 acquires, through the access management apparatus 30, a permission to access the relay server 10.

The access management apparatus 30 receives the access request from the relay server 20, based on which the access permission confirmation unit 304 confirms, with reference to the access permission list 66, that the access right to the relay server 10 is set in the relay server 20. The access permission confirmation unit 304 transmits, to the relay server 10, a permission request to request permission of the access to the relay server 10 by the relay server 20 (Step S2.1). The access recording unit 305 creates a new access record information 67.

FIG. 12 is a table showing the access record information 67. The access record information 67 is information that records an access status of the relay server 20 with respect to the relay server 10. In the access record information 67, there are recorded: the identification information of the relay server 20 as an access request source, and the identification information of the relay server 10 as an access destination. In a first row of update time, "13:45:23" is recorded, which is the time when the access management apparatus 30 received the access request. In a first row of connection state, "standby for access" is recorded. At the stage of the processing of Step S2.1, information is not recorded in the second row and the third row of the update time and the connection state.

When having received the permission request, the relay server 10 transmits, to the access management apparatus 30, an OK response to the permission request. The relay server 10 shifts to a state of accepting access coming from the relay server 20. When having received the OK response coming from the relay server 10, the access management apparatus 30 transmits, to the relay server 20, an OK response corresponding to the access request (Step S2). Note that, when the access management apparatus 30 can confirm that the access right to the relay server 10 has been set with reference to the access permission list 66, the access management apparatus 30 may transmit, to the relay server 20, the OK response corresponding to the access request (Step S2). In this case, in Step S2.1, the access management apparatus 30 may notify the relay server 10 that there is an access coming from the relay server 20.

In response to the receipt, from the access management apparatus 30, of the OK response corresponding to the access request (Step S2), the relay server 20 starts establishing the routing session. The routing session establishment unit 204 transmits an establishment request of the routing session to the relay server 10 (Step S3). After receiving a response from the relay server 10, the routing session establishment unit 204 transmits an ACK to the relay server 10 (Step S4). In such a way, the routing session is established between the relay server 10 and the relay server 20 (Step S5).

The routing session establishment unit 204 transmits, to the access management apparatus 30, a session establishment notice indicating that the routing session has been established (Step S5.1). Based on the session establishment notice, the access recording unit 305 updates the access record information 67. In the access record information 67, in the second row of the update time, "13:45:27" is recorded as a receiving time of the session establishment notice. In the second row of the connection state, "session is established" is recorded.

Next, the relay servers 10 and 20 exchange the network addresses of the LANs 1 and 2 as routing targets with each other. The relay server 10 transmits the network address of the LAN 1 to the relay server 20. The relay server 20 transmits the network address of the LAN 2 to the relay server 10. In such a way, communication between the relay server 20 and the general server 12 is enabled through the routing session. By using the relay server 20, the service technician can start the remote maintenance for the general server 12.

For example, the service technician operates the relay server 20 and inputs a control command for the general server 12. The relay server 20 creates a communication packet in which the control command is enclosed. As a transmission destination of the communication packet, IP address "172.16.0.12" of the general server 12 is set. As a transmission source of the communication packet, IP address "192.168.2.20" of the relay server 20 is set. The relay server 20 transmits the created communication packet to the relay server 10 through the routing session. The relay server 10 confirms that such a transmission destination IP address of the communication packet received through the routing session corresponds to the network address of the LAN 1. The relay server 10 transmits the received communication packet to the general server 12. The general server 12 performs processing related to the control command.

The general server 12 sends out a communication packet (hereinafter, referred to as a "response communication packet") that encloses response information to the control command therein. As a transmission destination of the response communication packet, IP address "192.168.2.20" of the relay server 20 is set. As a transmission source of the response communication packet, IP address "172.16.0.12" of the general server 12 is set.

In the case where the relay server 10 has received the response communication packet, the routing control unit 105 confirms that the IP address of the transmission destination (relay server 20) of the response communication packet corresponds to the network address of the LAN 2. In a similar way, the routing control unit 105 confirms that the IP address of the transmission source (general server 12) of the response communication packet corresponds to the network address of the LAN 1. By confirming these points, the routing control unit 105 determines that it is possible to route the received response communication packet. The response communication packet for which such routing is determined to be possible is transferred to the relay server 20 through the routing session. In such a way, the communication between the relay server 20 and the general server 12 is performed.

The relay servers 10 and 20 can perform routing control for the communication packets coming from all of the communication terminals connected to the LAN 1 or the LAN 2. The communication terminals include not only the relay servers and the client terminals, but also all of the terminals including the general server 12 and the general terminal 22. That is to say, the client terminal 21 and the general terminal 22 are also capable of performing communication with the general server 12 by using the routing session. Therefore, the remote maintenance for the general server 12 may be performed by using the client terminal 21 and the general terminal 22.

The relay servers 10 and 20 may exchange permitted terminal information, in which the communication terminals capable of using the routing session are specified, with each other. For example, the relay server 20 issues a notice on the identification information and IP address of the relay server 20 as the permitted terminal information. The relay server 10 issues a notice on the name and IP address of the general server 12 as the permitted terminal information. As a result, only a communication packet in which the relay server 20 and the general server 12 are designated as the transmission source and the transmission destination may be transferred by using the routing session. The client terminal 21 and the general terminal 22, which are not related to the remote maintenance for the general server 12, cannot communicate with the communication terminals in the LAN 1. Accordingly, security of the LAN 1 can be enhanced.

In the case where the remote maintenance is completed, the service technician instructs the relay server 20 to disconnect the routing session. The relay server 20 transmits a disconnection request of the routing session to the relay server 10 (Step S6). After receiving an OK response to the disconnection request from the relay server 10, the relay server 20 disconnects the routing session. After such disconnection of the routing session, the relay server 10 returns to a state of denying access from the relay server 20.

After the disconnection of the routing session, the relay server 20 transmits a disconnection notice of the routing session to the access management apparatus 30 (Step S6.1). The access recording unit 305 updates the access record information 67 based on the disconnection notice. In the access recording information 67, in the third row of the update time, "14:18:52" is recorded as a receipt time of the disconnection notice. In the third row of the connection state, "session is disconnected" is recorded.

As described above, when establishing the routing session with the relay server 10, the relay server 20 acquires the access permission from the relay server 10 through the access management apparatus 30. In such a way, the access management apparatus 30 is capable of controlling the communication between the relay server 10 and the relay server 20.

The access management apparatus 30 records the communication status from the time when the relay server 20 requests the access to the relay server 10 to the time when the routing session is disconnected. Therefore, the access status of the relay server 20 with respect to the relay server 10 can be readily and easily ascertained.

In the above-described preferred embodiment, the description has been made of the example where the access management apparatus 30 preferably functions as the relay server; however, the present invention is not limited to this. For example, the client terminal 31 may include the access permission confirmation unit 304 and the access recording unit 305. In this case, the client terminal 31 processes the access request coming from the relay server 20, and in addition, performs the creation and update of the access record information 67, and the like. A relay server similar to the relay servers 10 and 20 may be connected to the LAN 3 in place of the access management apparatus 30.

In the above-described preferred embodiment, the description has been made of the example where the routing session is established preferably between the relay server 10 and the relay server 20; however, the present invention is not limited to this.

For example, the routing session may be established between the relay server 10 and the client terminal 21. In this case, the client terminal 21 transmits, to the access management apparatus 30, the access request with respect to the relay server 10. The communication terminals connected to the LAN 2 can perform the remote maintenance for the general server 12 by using the routing session established between the relay server 10 and the client terminal 21.

Figure 13:
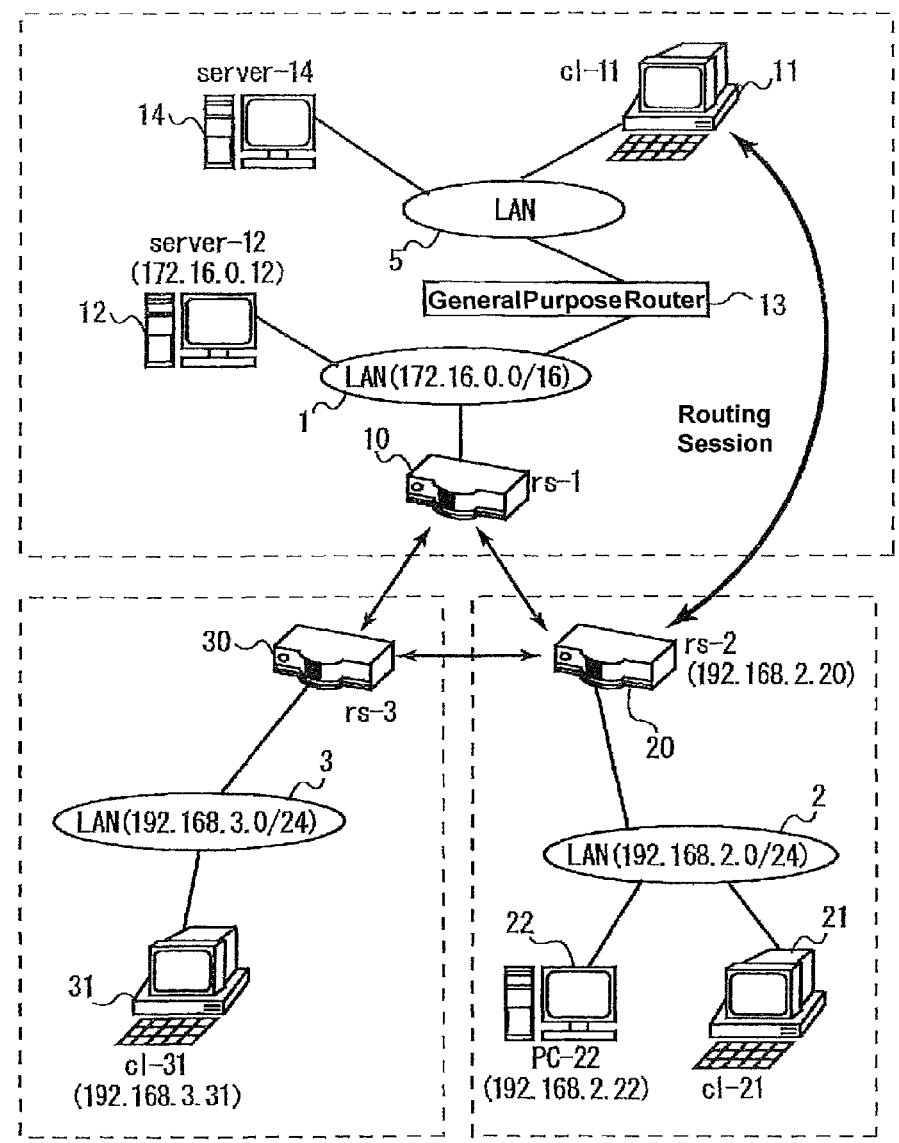
FIG. 13 is a view showing another configuration example of the relay communication system.

Moreover, a case shown in FIG. 13 is considered, where the LAN 1 and a LAN 5 are connected to each other through a general-purpose router 13, and the client terminal 11 and a general server 14 are connected to the LAN 5. In such a network configuration, the routing session may be established between the relay server 20 and the client terminal 11. In such a way, the communication terminals connected to the LAN 2 can perform the remote maintenance for the general server 14 connected to the LAN 5.

In this way, the relay servers and the client terminals function as relay apparatuses which, by using the routing session, relay communication packets transferred between the communication terminal that performs the remote maintenance and the communication terminal that serves as the maintenance target. The access management apparatus 30 manages the access between two relay apparatuses, and thereby preventing illegal access to the communication terminal (general server 12) that serves as the maintenance target.

2. Second Preferred Embodiment

A description will now be provided of a second preferred embodiment of the present invention. For the second preferred embodiment, FIGS. 1 to 6, FIG. 8, FIG. 10, FIG. 11 and FIG. 13 are used similarly to the first preferred embodiment, and the above description related to these drawings is also shared. However, for the second preferred embodiment, FIG. 7, FIG. 9 and FIG. 12 of the first preferred embodiment are not used, and FIG. 14, FIG. 15 and FIG. 16, which correspond to FIG. 7, FIG. 9 and FIG. 12, respectively, are used instead.

Figure 14:
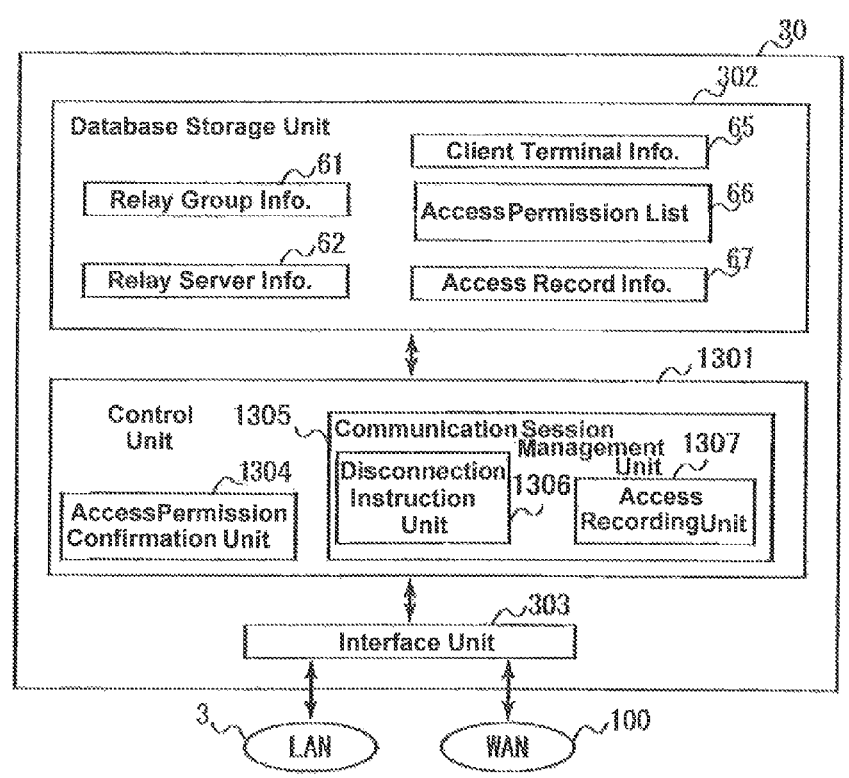
FIG. 14 is a view showing a configuration of an access management apparatus.

FIG. 14 is a view showing a configuration of an access management apparatus 30. The access management apparatus 30 includes a control unit 1301, the database storage unit 302, and the interface unit 303.

The control unit 1301 performs overall control for the access management apparatus 30. The control unit 1301 includes an access permission confirmation unit 1304 and a communication session management unit 1305. The access permission confirmation unit 1304, in response to an access request from the relay server 20, confirms whether or not the relay server 10 permits access from the relay server 20. The communication session management unit 1305 manages a routing session to be established between the relay server 10 and the relay server 20.

The communication session management unit 1305 includes a disconnection instruction unit 1306 and an access recording unit 1307. In the case where a fixed time has elapsed since the routing session was established, the disconnection instruction unit 1306 instructs the relay server 20 to disconnect the routing session. The access recording unit 1307 records a status of the relay server 20 accessing the relay server 10.

The database storage unit 302 stores therein: the relay group information 61, the relay server information 62, the client terminal information 65, the access permission list 66, and the access record information 67. In the client terminal information 65, information regarding the client terminal 31 is recorded. The access permission list 66 is a list of apparatuses whose accesses are permitted by the relay server 10 and the client terminal 11, which are connected to the LAN 1. The access record information 67 is information that records the change of the communication state of the relay server 20 that is accessing the relay server 10.

The interface unit 303 performs communication made within the LAN 3 and communication made through the WAN 100 in a similar way to the interface unit 103 of the relay server 10.

A description will now be provided of operations of the remote maintenance system when the service technician at the maintenance center operates the relay server 20 to perform the remote maintenance for the general server 12.

At the call center, the administrator of the access management apparatus 30 creates the access permission list 66. The access permission list 66 is stored in the database storage unit 302.

FIG. 8 is a view showing the access permission list 66. The access permission list 66 is the information in which the identification information of the access target apparatuses and the identification information of the apparatuses permitted to access the access target apparatuses are associated with each other. The relay servers and the client terminals are set in the access permission list 66, and not the general server 12 and the general terminal 22. In FIG. 8, "rs-3@abc.net" is the identification information of the access management apparatus 30. "cl-31@rs-3.abc.net" is the identification information of the client terminal 31.

For example, the apparatuses in which the access right to the relay server 10 is set are the relay server 20, the client terminals 21 and 31, and the access management apparatus 30. In this way, the access management apparatus 30 manages the apparatuses, which can access the relay server 10 and the client terminal 11, in the unified manner by using the access permission list 66. Simply by changing the access permission list 66, the apparatuses which can access the relay server 10 and the client terminal 11 can be changed with ease.

Figure 15:
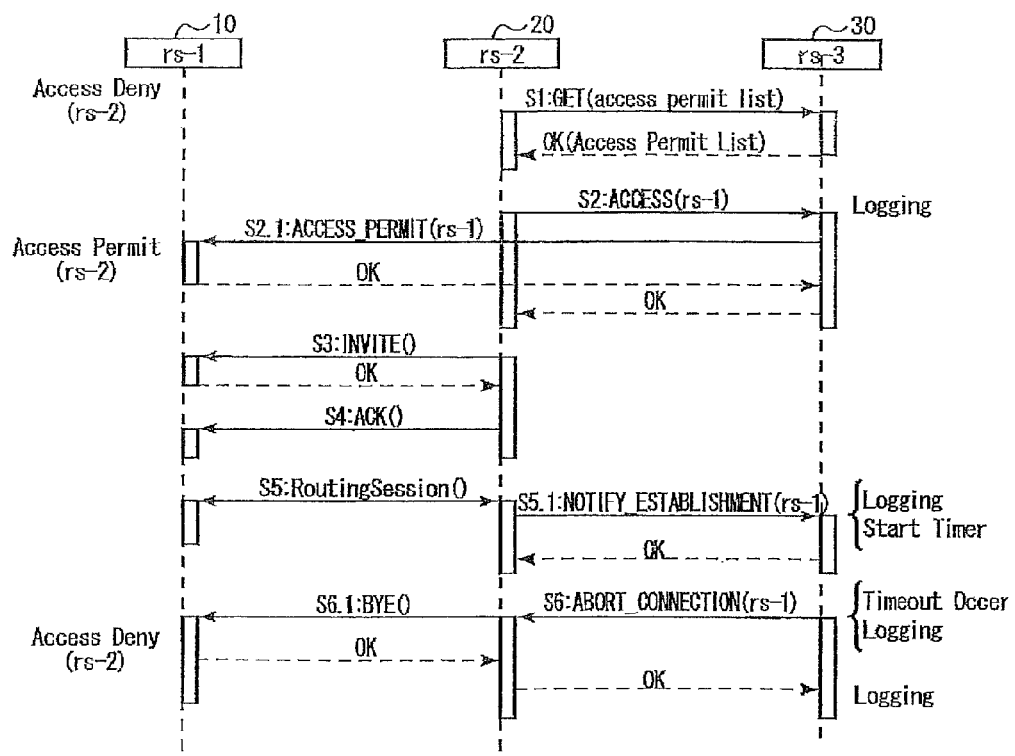
FIG. 15 is a chart showing a flow of remote maintenance.

FIG. 15 is a chart showing a flow of the remote maintenance for the general server 12. As an initial state, the relay server 10 is in a state of accepting access from the access management apparatus 30 and denying accesses from the relay server 20 and the client terminals 21 and 31.

Based on the operation by the service technician, the relay server 20 requests the access management apparatus 30 to transmit a selection list 68 (Step S1). The selection list 68 is a list of relay servers and client terminals which permit the access from the relay server 20. The access management apparatus 30 extracts, from the access permission list 66, the information corresponding to the relay server 20, and creates the selection list 68. The selection list 68 is transmitted from the access management apparatus 30 to the relay server 20.

FIG. 10 is a table showing the selection list 68. In the selection list 68, the relay server 10 and the client terminal 11 are set as the apparatuses which permit the access from the relay server 20. The service technician displays the selection list 68 on the monitor of the relay server 20, and confirms that the access right to the relay server 10 is set in the relay server 20.

Next, with reference to the relay server information 62, the service technician confirms that the relay server 10 is in operation. FIG. 11 is a view showing the relay server information 62 in the table format. Actually, the relay server information 62 is described in the eXtensible Markup Language (XML) format like the relay server information 52 (refer to FIG. 3).

In FIG. 11, the left-side columns of the relay server information 62 are the upper information 621, and correspond to the site tags (refer to FIG. 3). In the upper information 621, only the identification information and operation state of the relay servers are shown. The right-side columns of the relay server information 62 are the lower information 622, and correspond to the node tags (refer to FIG. 3). In the lower information 622, only the identification information and log-on destination of the client terminals are shown.

With reference to the relay server information 62 displayed on the monitor, the service technician confirms that the relay server 10 is in operation. The service technician operates the relay server 20, and instructs the relay server 20 to establish a routing session between the relay server 10 and the relay server 20.

FIG. 15 is referred to again. Based on such an instruction to establish the routing session, the relay server 20 transmits, to the access management apparatus 30, an access request with respect to the relay server 10 (Step S2). As mentioned above, the relay server 10 is in a state of not permitting the access from the relay server 20. Therefore, before requesting the relay server 10 to establish the routing session, the relay server 20 acquires, through the access management apparatus 30, the permission to access the relay server 10.

The access management apparatus 30 receives the access request from the relay server 20, based on which the access permission confirmation unit 304 confirms, with reference to the access permission list 66, that the access right to the relay server 10 is set in the relay server 20. The access permission confirmation unit 304 transmits, to the relay server 10, a permission request to request the permission of the access to the relay server 10 by the relay server 20 (Step S2.1). The access recording unit 1307 creates a new access record information 67.

FIG. 16 is a table showing the access record information 67. The access record information 67 is the information that records the access status of the relay server 20 with respect to the relay server 10. In the access record information 67, there are recorded: the identification information of the relay server 20 as the access request source, and the identification information of the relay server 10 as the access destination. In a first row of the update time, "13:45:23" is recorded, which is the time when the access management apparatus 30 received the access request. In a first row of the connection state, "standby for access" is recorded. At the stage of the processing of Step S2.1, information is not recorded in the second row to the fourth row of the update time and the connection state.

When having received the permission request, the relay server 10 transmits, to the access management apparatus 30, an OK response to the permission request. The relay server 10 shifts to a state of accepting access coming from the relay server 20. When having received the OK response coming from the relay server 10, the access management apparatus 30 transmits, to the relay server 20, the OK response corresponding to the access request (Step S2). Note that, when the access management apparatus 30 can confirm that the access right to the relay server 10 has been set with reference to the access permission list 66, the access management apparatus 30 may transmit, to the relay server 20, the OK response corresponding to the access request (Step S2). In this case, in Step S2.1, the access management apparatus 30 may notify the relay server 10 that there is an access coming from the relay server 20.

In response to the receipt, from the access management apparatus 30, of the OK response corresponding to the access request (Step S2), the relay server 20 starts establishing the routing session. The routing session establishment unit 204 transmits an establishment request of the routing session to the relay server 10 (Step S3). After receiving a response coming from the relay server 10, the routing session establishment unit 204 transmits an ACK to the relay server 10 (Step S4). In such away, the routing session is established between the relay server 10 and the relay server 20 (Step S5).

The routing session establishment unit 204 transmits, to the access management apparatus 30, a session establishment notice indicating that the routing session has been established (Step S5.1). The access management apparatus 30 receives the session establishment notice, in response to which the disconnection instruction unit 1306 starts to measure a time (session duration time) that has elapsed from the receipt of the session establishment notice. Based on the session establishment notice, the access recording unit 1307 updates the access record information 67. In the access record information 67, in the second row of the update time, "13:45:27" is recorded as the receiving time of the session establishment notice. In the second row of the connection state, "session is established" is recorded.

Next, the relay servers 10 and 20 exchange the network addresses of the LANs 1 and 2 as the routing targets with each other. The relay server 10 transmits the network address of the LAN 1 to the relay server 20. The relay server 20 transmits the network address of the LAN 2 to the relay server 10. In such a way, communication between the relay server 20 and the general server 12 is enabled through the routing session. By using the relay server 20, the service technician can start the remote maintenance for the general server 12.

For example, the service technician operates the relay server 20 and inputs the control command for the general server 12. The relay server 20 creates a communication packet in which the control command is enclosed. As the transmission destination of the communication packet, the IP address "172.16.0.12" of the general server 12 is set. As the transmission source of the communication packet, the IP address "192.168.2.20" of the relay server 20 is set. The relay server 20 transmits the created communication packet to the relay server 10 through the routing session. The relay server 10 confirms that the transmission destination IP address of the communication packet received through the routing session corresponds to the network address of the LAN 1. The relay server 10 transmits the received communication packet to the general server 12. The general server 12 performs the processing related to the control command.

The general server 12 sends out a communication packet (hereinafter, referred to as a "response communication packet") that encloses the response information to the control command therein. As the transmission destination of the response communication packet, the IP address "192.168.2.20" of the relay server 20 is set. As the transmission source of the response communication packet, the IP address "172.16.0.12" of the general server 12 is set.

In the case where the relay server 10 has received the response communication packet, the routing control unit 105 confirms that the IP address of the transmission destination (relay server 20) of the response communication packet corresponds to the network address of the LAN 2. In a similar way, the routing control unit 105 confirms that the IP address of the transmission source (general server 12) of the response communication packet corresponds to the network address of the LAN 1. By confirming these points, the routing control unit 105 determines that it is possible to route the received response communication packet. The response communication packet for which the routing is determined to be possible is transferred to the relay server 20 through the routing session. In such a way, the communication between the relay server 20 and the general server 12 is performed.

The relay servers 10 and 20 can perform routing control for the communication packets coming from all of the communication terminals connected to the LAN 1 or the LAN 2. The communication terminals here include not only the relay servers and the client terminals, but also all of the terminals including the general server 12 and the general terminal 22. That is to say, the client terminal 21 and the general terminal 22 are also capable of performing communication with the general server 12 by using the routing session. Therefore, the remote maintenance for the general server 12 may be performed by using the client terminal 21 and the general terminal 22.

Though not shown in FIG. 15, in the case where the service technician completes the remote maintenance and instructs the disconnection of the routing session, the relay servers 10 and 20 disconnect the routing session. The relay server 20 transmits a disconnection completion notice of the routing session to the access management apparatus 30. Details of the disconnection of the routing session will be described later.

There may be a case where, though the service technician completes the remote maintenance for the general server 12, the service technician does not instruct the relay server 20 to disconnect the routing session. In such a case, the access management apparatus 30 instructs the relay server 20 to disconnect the routing session.

Specifically, after receiving the session establishment notice, the disconnection instruction unit 1306 measures the session duration time. In the case where the disconnection instruction unit 1306 does not receive the disconnection completion notice from the relay server 20, and the session duration time exceeds a time limit (for example, one hour) preset in the disconnection instruction unit 1306, the disconnection instruction unit 1306 issues a disconnection instruction of the routing session to the relay server 20 (Step S6). In Step S6, the access management apparatus 30 may issue the disconnection instruction of the routing session to the relay server 10. In this case, the relay server 10 operates in a similar way to the relay server 20 described as follows.

The access recording unit 1307 updates the access record information 67 based on the disconnection instruction. In the access recording information 67, in the third row of the update time, "14:45:27" is recorded as a time when the disconnection instruction is issued to the relay server 20. In the third row of the connection state, "session disconnection is instructed" is recorded.

In response to the disconnection instruction, the relay server 20 transmits a disconnection request of the routing session to the relay server 10 (Step S6.1). After the relay server 20 receives, from the relay server 10, an OK response to the disconnection request, the routing session is disconnected. After the disconnection of the routing session, the relay server transmits, to the access management apparatus 30, a disconnection completion notice as a response to the disconnection instruction from the access management apparatus 30. The relay server 10 returns to a state of denying access from the relay server 20.

Based on the disconnection completion notice, the access recording unit 1307 updates the access record information 67. In a fourth row of the update time, "14:45:29" is recorded as a receipt time of the disconnection completion notice. In a fourth row of the connection state, "session is disconnected" is recorded.

As described above, in the case where a fixed time has elapsed since the routing session was established, the access management apparatus 30 forces the relay server 20 to disconnect the routing session. In such a way, the routing session is prevented from being left in the established state. Hence, a third party other than the service technician can be prevented from illegally accessing the communication terminal connected to the LAN 1, by using the routing session.

As mentioned above, there may be a case where, before the session duration time exceeds the time limit, the routing session is disconnected based on the disconnection instruction from the service technician. In this case, the relay server 20 spontaneously transmits the disconnection completion notice to the access management apparatus 30. The disconnection instruction unit 1306 stops measuring the session duration time when the access management apparatus 30 receives the disconnection completion notice. The access recording unit 1307 updates the access record information 67 based on the disconnection completion notice. In this case, the information corresponding to the third row of the update time and the connection state in the access record information 67 is not recorded.

As described above, when establishing the routing session with the relay server 10, the relay server 20 acquires the access permission from relay server 10 through the access management apparatus 30. In such a way, the access management apparatus 30 is capable of controlling the communication between the relay server 10 and the relay server 20.

The access management apparatus 30 measures the session duration time after receiving the session establishment notice, and instructs the relay server 20 to disconnect the routing session when the session duration time exceeds the time limit. In such a way, the routing session can be surely disconnected.

In the above-described preferred embodiment, the description has been made of the example where the access management apparatus 30 preferably transmits the disconnection instruction to the relay server 20 when the session duration time exceeds the time limit; however, the present invention is not limited to this. The access management apparatus 30 may transmit the disconnection instruction to the relay server 20 in response to an instruction from the administrator of the access management apparatus 30.

In the above-described preferred embodiment, the description has been made of the example where the access management apparatus 30 preferably functions as the relay server; however, the present invention is not limited to this. For example, the client terminal 31 may include the access permission confirmation unit 1304 and the communication session management unit 1305. In this case, the client terminal 31 processes the access request coming from the relay server 20. The disconnection instruction of the routing session and the processing regarding the access record information 67 are also performed by the client terminal 31. A relay server similar to the relay servers 10 and 20 may be connected to the LAN 3 in place of the access management apparatus 30.

In the above-described preferred embodiment, the description has been made of the example where the routing session is established preferably between the relay server 10 and the relay server 20; however, the present invention is not limited to this.

For example, the routing session may be established between the relay server 10 and the client terminal 21. In this case, the client terminal 21 transmits, to the access management apparatus 30, the access request with respect to the relay server 10. The communication terminals connected to the LAN 2 can perform the remote maintenance for the general server 12 by using the routing session established between the relay server 10 and the client terminal 21.

Moreover, a case shown in FIG. 13 is considered, where the LAN 1 and a LAN 5 are connected to each other through the general-purpose router 13, and the client terminal 11 and the general server 14 are connected to the LAN 5. In such a network configuration, the routing session may be established between the relay server 20 and the client terminal 11. In such a way, the communication terminals connected to the LAN 2 can perform the remote maintenance for the general server 14 connected to the LAN 5.

In this way, the relay servers and the client terminals function as the relay apparatuses which, by using the routing session, relay communication packets transferred between the communication terminal that performs the remote maintenance and the communication terminal that serves as the maintenance target. The access management apparatus 30 manages the access between two relay apparatuses, and thereby preventing illegal access to the communication terminal (general server 12) that serves as the maintenance target.

In the above-described preferred embodiment, the description has been made of the example where the time limit is preferably fixed; however, the present invention is not limited to this. The time limits corresponding to the access destinations of the relay server 20 may be set. For example, the time limit may be set at one hour when the relay server 20 accesses the relay server 10, and the time limit may be set at 30 minutes when the relay server 20 accesses the client terminal 21.

3. Third Preferred Embodiment

Figure 17:
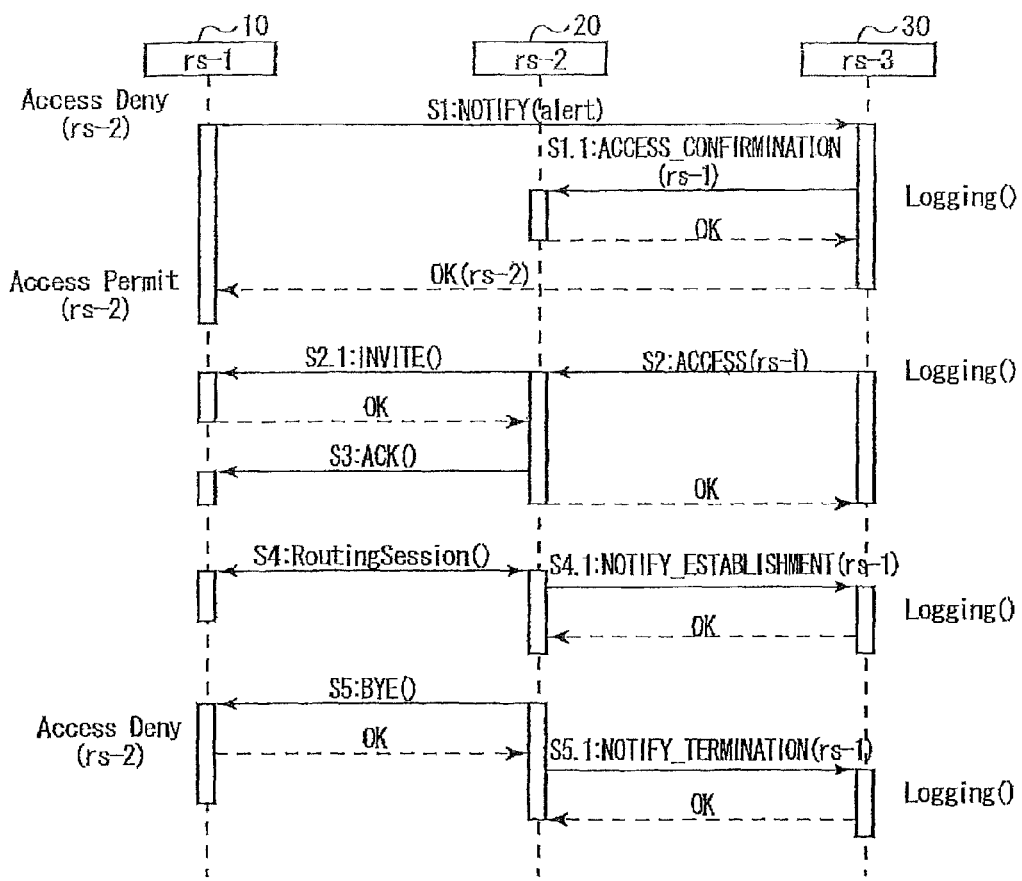
FIG. 17 is a chart showing a flow of remote maintenance.

A description is provided below of a third preferred embodiment of the present invention. For the third preferred embodiment, FIGS. 1 to 8, FIG. 11 and FIG. 13 are used similarly to the first preferred embodiment, and the above description related to these drawings is also shared. However, for the third preferred embodiment, FIG. 17 and FIG. 18 are used instead, which correspond to FIG. 9 and FIG. 11, respectively.

A description is made of operations of the remote maintenance system when the service technician at the maintenance center operates the relay server 20 to perform the remote maintenance for the general server 12.

At the call center, the administrator of the access management apparatus 30 creates the access permission list 66. The access permission list 66 is stored in the database storage unit 302.

FIG. 8 is a view showing the access permission list 66. The access permission list 66 is the information in which the identification information of the access target apparatuses and the identification information of the apparatuses permitted to access the access target apparatuses are associated with each other. The relay servers and the client terminals are set in the access permission list 66, and not the general server 12 and the general terminal 22. In FIG. 8, "rs-3@abc.net" is the identification information of the access management apparatus 30. "cl-31@rs-3.abc.net" is the identification information of the client terminal 31.

For example, the apparatuses in which the access right to the relay server 10 is set are the relay server 20, the client terminals 21 and 31, and the access management apparatus 30. In this way, the access management apparatus 30 manages the apparatuses, which can access the relay server 10 and the client terminal 11, in the unified manner by using the access permission list 66. Simply by changing the access permission list 66, the apparatuses which can access the relay server 10 and the client terminal 11 can be changed with ease.

FIG. 17 is a chart showing a flow of the remote maintenance for the general server 12. As an initial state, the relay server 10 is in a state of accepting access from the access management apparatus 30 and denying accesses from the relay server 20 and the client terminals 21 and 31.

The relay server 10 monitors the operations of the general server 12. In the case where an error occurs in the general server 12, the relay server 10 automatically issues an error occurrence notice to the access management apparatus 30 (Step S1). In Step S1, the relay server 10 may transmit the error occurrence notice based on an operation by an administrator of the LAN 1. The relay server 10 may transmit, to the access management apparatus 30, a maintenance start request to request the remote maintenance for the general server 12.

In the case where the access management apparatus 30 receives the error occurrence notice or the maintenance start request, the access permission confirmation unit 304 specifies the apparatus that performs the remote maintenance for the general server 12. As shown in FIG. 5, the general server 12 is connected to the LAN 1. Therefore, based on the access permission list 66, the access permission confirmation unit 304 specifies the relay server 20, which can access the relay server 10, as the apparatus that performs the remote maintenance. Though not shown in FIG. 8, in the access permission list 66, priorities of the apparatuses which perform the remote maintenance for the access target apparatus are set. Based on the priorities in the access permission list 66, the relay server 20 is specified as the apparatus that performs the remote maintenance.

Next, with reference to the relay server information 62, the access permission confirmation unit 304 confirms that the relay servers 10 and 20 are in operation. FIG. 11 is a view showing the relay server information 62 in the table format. Actually, the relay server information 62 is described in the eXtensible Markup Language (XML) format like the relay server information 52 (refer to FIG. 3).

In FIG. 11, the left-side columns of the relay server information 62 are the upper information 621, and correspond to the site tags (refer to FIG. 3). In the upper information 621, only the identification information and operation state of the relay servers are shown. The right-side columns of the relay server information 62 are the lower information 622, and correspond to the node tags (refer to FIG. 3). In the lower information 622, only the identification information and log-on destination of the client terminals are shown.

FIG. 17 is referred to again. The access management apparatus 30 transmits, to the relay server 20, a confirmation request to confirm whether or not the relay server 20 can handle the remote maintenance for the general server 12 (Step S1.1). When having received the confirmation request, the relay server 20 displays, on the monitor, a message that requests the execution of the remote maintenance for the general server 12. The service technician operates the relay server 20, and instructs the relay server 20 to handle the remote maintenance. An OK response corresponding to the confirmation request is transmitted from the relay server 20 to the access management apparatus 30.

Simultaneously with the transmission (Step S1.1) of the confirmation request, the access recording unit 305 creates a new access record information 67.

FIG. 18 is a table showing the access record information 67. In the access record information 67 shown in FIG. 18, the identification information of the relay server 20 is recorded as the access request source, and the identification information of the relay server 10 is registered as the access destination. In a first row of the update time, "13:45:18" is recorded, which is the transmission time of the confirmation request. In a first row of the connection state, "confirmation request is transmitted" is recorded. At the stage of Step S1.1, information is not recorded in the second to the fourth rows of the update time and the connection state.

When having received an OK response to the confirmation request (Step S1.1), the access permission confirmation unit 304 issues to the relay server 10, as a response to the error occurrence notice (Step S1), a notice indicating that the relay server 20 is starting the access. The relay server 10 shifts to a state of accepting access coming from the relay server 20.

Next, the access permission confirmation unit 304 transmits, to the relay server 20, an access start request to instruct the relay server 20 to access the relay server 10 (Step S2). In the access record information 67, in the second row of the update time, "13:45:23" is recorded, which is the transmission time of the access start request. "access is instructed" is recorded in the second row of the connection state.

In response to the receipt of the access start request, the relay server 20 starts establishing the routing session. The routing session establishment unit 204 transmits an establishment request of the routing session to the relay server 10 (Step S2.1). After receiving an OK response to the establishment request of the routing session from the relay server 10, the routing session establishment unit 204 transmits an ACK to the relay server 10 (Step S3). The relay server 20 transmits, to the access management apparatus 30, an OK response to the access start request (Step S2).

With such processing of Steps S2.1 and S3, the routing session is established between the relay server 10 and the relay server 20 (Step S4). The routing session establishment unit 204 transmits, to the access management apparatus 30, the session establishment notice indicating that the routing session has been established (Step S4.1). The access recording unit 305 updates the access record information 67 based on the session establishment notice. In the access record information 67, in the third row of the update time, "13:45:27" is recorded as the receiving time of the session establishment notice. In the third row of the connection state, "session is established" is recorded.

Next, the relay servers 10 and 20 exchange the network addresses of the LANs 1 and 2 as the routing targets with each other. The relay server 10 transmits the network address of the LAN 1 to the relay server 20. The relay server 20 transmits the network address of the LAN 2 to the relay server 10. In such a way, the communication between the relay server 20 and the general server 12 is enabled through the routing session. By using the relay server 20, the service technician can start the remote maintenance for the general server 12.

For example, the service technician operates the relay server 20 and inputs the control command for the general server 12. The relay server 20 creates the communication packet in which the control command is enclosed. As the transmission destination of the communication packet, the IP address "172.16.0.12" of the general server 12 is set. As the transmission source of the communication packet, the IP address "192.168.2.20" of the relay server 20 is set. The relay server 20 transmits the created communication packet to the relay server 10 through the routing session. The relay server 10 confirms that the transmission destination IP address of the communication packet received through the routing session corresponds to the network address of the LAN 1. The relay server 10 transmits the received communication packet to the general server 12. The general server 12 performs the processing related to the control command.

The general server 12 sends out a communication packet (hereinafter, referred to as a "response communication packet") that encloses the response information to the control command therein. As the transmission destination of the response communication packet, the IP address "192.168.2.20" of the relay server 20 is set. As the transmission source of the response communication packet, the IP address "172.16.0.12" of the general server 12 is set.

In the case where the relay server 10 has received the response communication packet, the routing control unit 105 confirms that the IP address of the transmission destination (relay server 20) of the response communication packet corresponds to the network address of the LAN 2. In a similar way, the routing control unit 105 confirms that the IP address of the transmission source (general server 12) of the response communication packet corresponds to the network address of the LAN 1. By confirming these points, the routing control unit 105 determines that it is possible to route the received response communication packet. The response communication packet for which the routing is determined to be possible is transferred to the relay server 20 through the routing session. In such a way, the communication between the relay server 20 and the general server 12 is performed.

The relay servers 10 and 20 can perform routing control for the communication packets coming from all of the communication terminals connected to the LAN 1 or the LAN 2. The communication terminals include not only the relay servers and the client terminals, but also all of the terminals including the general server 12 and the general terminal 22. That is to say, the client terminal 21 and the general terminal 22 are also capable of performing communication with the general server 12 by using the routing session. Therefore, the remote maintenance for the general server 12 may be performed by using the client terminal 21 and the general terminal 22.

The relay servers 10 and 20 may exchange the permitted terminal information, in which the communication terminals capable of using the routing session are specified, with each other. For example, the relay server 20 issues a notice on the identification information and IP address of the relay server 20 as the permitted terminal information. The relay server 10 issues a notice on the name and IP address of the general server 12 as the permitted terminal information. As a result, only the communication packet in which the relay server 20 and the general server 12 are designated as the transmission source and the transmission destination may be transferred by using the routing session. The client terminal 21 and the general terminal 22, which are not related to the remote maintenance for the general server 12, cannot communicate with the communication terminals in the LAN 1. Accordingly, the security of the LAN 1 can be enhanced.

In the case where the remote maintenance is completed, the service technician instructs the relay server 20 to disconnect the routing session. The relay server 20 transmits a disconnection request of the routing session to the relay server 10 (Step S5). After receiving an OK response to the disconnection request from the relay server 10, the relay server 20 disconnects the routing session. After the disconnection of the routing session, the relay server 10 returns to the state of denying access from the relay server 20.

After the disconnection of the routing session, the relay server 20 transmits a disconnection notice of the routing session to the access management apparatus 30 (Step S5.1). The access recording unit 305 updates the access record information 67 based on the disconnection notice. In the access recording information 67, in the fourth row of the update time, "14:18:52" is recorded as the receipt time of the disconnection notice. In the fourth row of the connection state, "session is disconnected" is recorded.

As described above, when having received the error occurrence notice, the access management apparatus 30 specifies the relay server 20 as the apparatus that accesses the relay server 10, based on the access permission list 66. The relay server 20 starts the remote maintenance for the general server 12 by using the routing session established based on the access start request. In this way, the access management apparatus 30 can control the communication between the relay server 10 and the relay server 20 according to the operation state of the general server 12. Hence, it is possible to quickly deal with the error that has occurred in the general server 12.

The access management apparatus 30 transmits the confirmation request to the relay server 20 specified based on the access permission list 66. In such a way, the access management apparatus 30 can instruct an apparatus, which can surely access the relay server 10, to access the relay server 10.

The access management apparatus 30 records the communication status of the relay server 20 from the time when the confirmation request is transmitted to the relay server 20 to the time when the routing session is disconnected. Therefore, the communication status of the relay server 20 can be grasped with ease.

In the above-described preferred embodiment, the description has been made of the example where the access management apparatus 30 preferably functions as the relay server; however, the present invention is not limited to this. For example, the client terminal 31 may include the access permission confirmation unit 304 and the access recording unit 305. In this case, the client terminal 31 performs the transmission (Step S1.1) of the confirmation request, the transmission (Step S2) of the access start request, the update of the access record information 67, and the like. To the LAN 3, a relay server similar to the relay servers 10 and 20 may be connected in place of the access management apparatus 30.

In the above-described preferred embodiment, the description has been made of the example where the routing session is established preferably between the relay server 10 and the relay server 20; however, the present invention is not limited to this.

For example, the routing session may be established between the relay server 10 and the client terminal 21. In this case, the access management apparatus 30 transmits the confirmation request (Step S1.1) and the access start request (Step S2) to the client terminal 21. The communication terminals connected to the LAN 2 can perform the remote maintenance for the general server 12 by using the routing session established between the relay server 10 and the client terminal 21.

Moreover, a case shown in FIG. 13 is considered, where the LAN 1 and a LAN 5 are connected to each other through the general-purpose router 13, and the client terminal 11 and the general server 14 are connected to the LAN 5. In such a network configuration, the routing session may be established between the relay server 20 and the client terminal 11. In such a way, the communication terminals connected to the LAN 2 can perform the remote maintenance for the general server 14 connected to the LAN 5.

In this way, the relay servers and the client terminals function as the relay apparatuses which, by using the routing session, relay communication packets transferred between the communication terminal that performs the remote maintenance and the communication terminal that serves as the maintenance target. The access management apparatus 30 manages the access between two relay apparatuses, and thereby preventing illegal access to the communication terminal (general server 12) that serves as the maintenance target.

The description has been made above of the preferred embodiments of the present invention; however, the present invention is not limited to the above-described preferred embodiments, and is modifiable in various ways within the scope without departing from the spirit of the present invention. In particular, it is possible to combine the plurality of preferred embodiments described in this specification and modification examples thereof with one another according to needs.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A relay communication system comprising:
a first relay apparatus provided in a first LAN;
a second relay apparatus provided in a second LAN; and
an access management apparatus defined by a third relay apparatus provided in a third LAN and configured to hold an access permission list in which identification information of access target apparatuses and identification information of apparatuses permitted to access the access target apparatuses are associated with each other; wherein
the first relay apparatus is configured to request, to the access management apparatus, a selection list of apparatuses accessible by the first relay apparatus, select the second relay apparatus from the selection list, and transmit to the access management apparatus an access request to the second relay apparatus;
the second relay apparatus is configured to be in an initial state of denying access from apparatuses other than the access management apparatus, and change to a standby state for connection to the first relay apparatus when having received an access permission request from the access management apparatus;
the access management apparatus includes:
an access permission unit configured to extract, from the access permission list, information corresponding to the first relay apparatus, create the selection list, and transmit the selection list to the first relay apparatus, and when having received from the first relay apparatus an access request to the second relay apparatus, determine whether or not to permit the first relay apparatus to access the second relay apparatus based on the access permission list;
a notification unit configured to, in a case where the first relay apparatus is permitted to access the second relay apparatus, notify the second relay apparatus of the access permission request, and notify the first relay apparatus of an access permission to the second relay apparatus; and
an access recording unit configured to record a status of access from the first relay server to the second relay server as an access record information, update the access record information based on a session establishment notice from the first relay server including an update time, and update the access record information based on a session disconnection notice from the first relay server including a receipt time;
the first relay apparatus includes:
a communication session establishment unit configured to establish a communication session with the second relay apparatus when having received the access permission, and an access status notification unit configured to notify the access management apparatus of the session establishment notice and the session disconnection notice;

each of the first relay apparatus and the second relay apparatus includes a relay communication unit configured to relay, by using the communication session, communication between a first communication terminal connected to the first LAN on the first relay apparatus side and a second communication terminal connected to the second LAN on the second relay apparatus side; and the first, second, and third LANs are separate and different LANs.

2. The relay communication system according to claim 1, wherein the access management apparatus further includes a list transmission unit configured to transmit the selection list to the first relay apparatus, and the first relay apparatus further includes a selection unit configured to select the second relay apparatus as an access request destination by using the selection list.

3. The relay communication system according to claim 1, wherein each of the first relay apparatus, the second relay apparatus and the access management apparatus further includes a relay server information sharing unit configured to share among each other a relay server information, the relay server information includes activation information of the first relay apparatus and the second relay apparatus, and activation/registration information of client terminals connected to the first relay apparatus and client terminals connected to the second relay apparatus.

4. The relay communication system according to claim 3, wherein the first relay apparatus further includes a display unit configured to display the relay server information.

5. The relay communication system according to claim 1, wherein the communication session is a routing session that serves as a media session that performs routing control for a communication packet transferred between the first relay apparatus and the second relay apparatus.

6. The relay communication system according to 5, wherein, in the routing session, the first relay apparatus and the second relay apparatus exchange network addresses with each other after the routing session is established.

7. The relay communication system according to claim 6, wherein, in exchanging the network addresses, the first relay apparatus and the second relay apparatus respectively permit accesses to all terminals connected to the respective LANs to which the first relay apparatus and the second relay apparatus are connected.

8. The relay communication system according to claim 6, wherein, in exchanging the network addresses, the first relay apparatus or the second relay apparatus respectively permit accesses to a portion of terminals connected to the respective LANs to which the first relay apparatus and the second relay apparatus are connected.

9. An access management apparatus capable of performing communication with a first relay apparatus provided in a first LAN and a second relay apparatus provided in a second LAN, comprising:

a list transmission unit configured to hold an access permission list in which identification information of access target apparatuses and identification information of apparatuses permitted to access the access target apparatuses are associated with each other, extract, from the access permission list, information corresponding to the first relay apparatus, create a selection list of apparatuses accessible by the first relay apparatus, and transmit the selection list to the first relay apparatus;

an access permission unit configured to, when having received from the first relay apparatus an access request to the second relay apparatus, determine whether or not to permit the first relay apparatus to access the second relay apparatus based on the access permission list;

a notification unit configured to, in a case where the first relay apparatus is permitted to access the second relay apparatus, notify the second relay apparatus of an access from the first relay apparatus, and notify the first relay apparatus of an access permission to the second relay apparatus; and an access recording unit configured to record a status of access from the first relay server to the second relay server as an access record information, update the access record information based on a session establishment notice from the first relay server including an update time, and update the access record information based on a session disconnection notice from the first relay server including a receipt time; wherein the access management apparatus is defined by a third relay apparatus provided in a third LAN; and the first, second, and third LANs are separate and different LANs.

10. A relay communication system comprising:

a first relay apparatus provided in a first LAN;

a second relay apparatus provided in a second LAN; and an access management apparatus defined by a third relay apparatus provided in a third LAN; wherein the access management apparatus includes:

an access permission unit configured to hold an access permission list in which identification information of access target apparatuses and identification information of apparatuses permitted to access the access target apparatuses are associated with each other, extract, from the access permission list, information corresponding to the first relay apparatus, create a selection list of apparatuses accessible by the first relay apparatus, transmit the selection list to the first relay apparatus, and, when having received from the first relay apparatus an access request to the second relay apparatus, determine whether or not to permit the first relay apparatus to access the second relay apparatus based on the access permission list;

a notification unit configured to, in a case where the first relay apparatus is permitted to access the second relay apparatus, notify the second relay apparatus of an access from the first relay apparatus, and notify the first relay apparatus of an access permission to the second relay apparatus; and a session information acquisition unit configured to acquire, from the first relay apparatus, a session information regarding a communication session established between the first relay apparatus and the second relay apparatus based on the access permission;

the first relay apparatus is configured to request the access management apparatus to transmit the selection list and includes a communication session establishment unit configured to establish the communication session with the second relay apparatus when having received the access permission;

each of the first relay apparatus and the second relay apparatus includes:

a relay communication unit configured to relay, by using the communication session, communication between a first communication terminal connected to the first LAN on the first relay apparatus side and a second communication terminal connected to the second LAN on the second relay apparatus side;

the access management apparatus further includes:
a disconnection instruction unit configured to, in a case where it has been determined that the communication session satisfies a predetermined condition based on the session information, transmit a disconnection instruction of the communication session to the first relay apparatus or the second relay apparatus; and
an access recording unit configured to record a status of access from the first relay server to the second relay server as an access record information, update the access record information based on a session establishment notice from the first relay server including an update time, and update the access record information based on a session disconnection notice from the first relay server including a receipt time; and the first, second, and third LANs are separate and different LANs.

11. The relay communication system according to claim 10, wherein the first relay apparatus further includes:
an establishment notification unit configured to transmit the establishment notice of the communication session to the access management apparatus; and
the disconnection instruction unit instructs the first relay apparatus to disconnect the communication session in a case where a time that has elapsed since the establishment notice was received reaches a predetermined time or more.

12. The relay communication system according to claim 10, wherein each of the first relay apparatus, the second relay apparatus and the access management apparatus further includes a relay server information sharing unit configured to share among each other a relay server information, the relay server information includes activation information of the first relay apparatus and the second relay apparatus, and activation/registration information of client terminals connected to the first relay apparatus and client terminals connected to the second relay apparatus.

13. The relay communication system according to claim 12, wherein the first relay apparatus further includes a display unit configured to display the relay server information.

14. The relay communication system according to claim 10, wherein the communication session is a routing session that serves as a media session that performs routing control for a communication packet transferred between the first relay apparatus and the second relay apparatus.

15. The relay communication system according to claim 14, wherein, in the routing session, the first relay apparatus and the second relay apparatus exchange network addresses with each other after the routing session is established.

16. The relay communication system according to claim 15, wherein, in exchanging the network addresses, the first relay apparatus and the second relay apparatus respectively permit accesses to all terminals connected to the respective LANs to which the first relay apparatus and the second relay apparatus are connected.

17. The relay communication system according to claim 15, wherein, in exchanging the network addresses, the first relay apparatus or the second relay apparatus respectively permit accesses to a portion of terminals connected to the respective LANs to which the first relay apparatus and the second relay apparatus are connected.

18. An access management apparatus capable of performing communication with a first relay apparatus provided in a first LAN and a second relay apparatus provided in a second LAN, comprising:
an access permission unit configured to hold an access permission list in which identification information of access target apparatuses and identification information of apparatuses permitted to access the access target apparatuses are associated with each other, extract, from the access permission list, information corresponding to the first relay apparatus, create a selection list of apparatuses accessible by the first relay apparatus, transmit the selection list to the first relay apparatus, and, when having received from the first relay apparatus an access request to the second relay apparatus, determine whether or not to permit the first relay apparatus to access the second relay apparatus based on the access permission list;
a notification unit configured to, in a case where the first relay apparatus is permitted to access the second relay apparatus, notify the second relay apparatus of an access from the first relay apparatus, and notify the first relay apparatus of an access permission to the second relay apparatus;
a session information acquisition unit configured to acquire, from the first relay apparatus, a session information regarding a communication session established between the first relay apparatus and the second relay apparatus based on the access permission;
a disconnection instruction unit configured to, in a case where it has been determined that the communication session satisfies a predetermined condition based on the session information, transmit a disconnection instruction of the communication session to the first relay apparatus or the second relay apparatus; and
an access recording unit configured to record a status of access from the first relay server to the second relay server as an access record information, update the access record information based on a session establishment notice from the first relay server including an update time, and update the access record information based on a session disconnection notice from the first relay server including a receipt time; wherein the access management apparatus is defined by a third relay apparatus provided in a third LAN; and the first, second, and third LANs are separate and different LANs.

\* \* \* \* \*